US006071112A

United States Patent [19]
Calvin et al.

[11] Patent Number: 6,071,112
[45] Date of Patent: Jun. 6, 2000

[54] AUTOMATED METHOD AND APPARATUS FOR SINGLE SIDED HYDRATION OF SOFT CONTACT LENSES IN PACKAGE CARRIERS

[75] Inventors: Olin W. Calvin; Mark E. Schlagel; Darren S. Keene, all of Jacksonville, Fla.; Ture Kindt-Larsen, Søllerødvej, Denmark; Craig W. Walker, Jacksonville, Fla.; Wallace A. Martin, Orange Park, Fla.; John C. Heaton, Atlantic Beach, Fla.

[73] Assignee: Johnson & Johnson Vision Products, Inc., Jacksonville, Fla.

[21] Appl. No.: 09/363,544

[22] Filed: Jul. 29, 1999

Related U.S. Application Data

[60] Division of application No. 08/696,402, Aug. 14, 1996, Pat. No. 6,012,471, which is a continuation-in-part of application No. 08/432,935, May 1, 1995, Pat. No. 5,640,980, which is a continuation-in-part of application No. 08/258,556, Jun. 10, 1994, Pat. No. 5,476,111.

[51] Int. Cl.[7] .......... C08J 7/00

[52] U.S. Cl. .......... 425/445; 134/113; 134/901; 206/5.1

[58] Field of Search .......... 206/5.1; 134/901, 134/61, 113; 425/445

[56] References Cited

U.S. PATENT DOCUMENTS

| | | | |
|---|---|---|---|
| 4,640,489 | 2/1987 | Larsen | 249/122 |
| 5,036,971 | 8/1991 | Seden et al. | 206/5.1 |
| 5,080,839 | 1/1992 | Kindt-Larsen | 206/5.1 X |
| 5,094,609 | 3/1992 | Kindt-Larsen | 206/5.1 X |
| 5,407,062 | 4/1995 | Shannon et al. | 206/5.1 |
| 5,476,111 | 12/1995 | Andersen et al. | 134/58 R |
| 5,524,419 | 6/1996 | Shannon | 53/431 |
| 5,578,331 | 11/1996 | Martin et al. | 134/901 X |
| 5,620,088 | 4/1997 | Martin et al. | 206/5.1 |
| 5,640,980 | 6/1997 | Keene et al. | 134/901 X |

FOREIGN PATENT DOCUMENTS

| | | |
|---|---|---|
| 0686488 | 12/1995 | European Pat. Off. . |
| 0740998 | 11/1996 | European Pat. Off. . |
| 2040213 | 8/1980 | United Kingdom . |
| 2237241 | 5/1991 | United Kingdom . |

*Primary Examiner*—Philip R. Coe
*Attorney, Agent, or Firm*—Mark Warfield

[57] ABSTRACT

An automated means for hydrating and packaging a molded hydrophilic contact lens in one of the mold parts used to mold the lens is provided in which a first robotic assembly removes a plurality of contact lens molds from a production line carrier, each of the lens molds having a contact lens adhered therein. The first robotic assembly transports the molds to a first staging area where the lens molds are sandwiched between a lens mold carrier and a top chamber plate to form a first hydration carrier. The hydration carrier is then transported through a plurality of flushing or extraction stations wherein fresh deionized water is introduced into the hydration chambers at each hydration station to flush leachable substances from the hydration chamber. At each flushing station, fresh deionized water is introduced into the hydration chamber to remove previously extracted impurities and the products of hydrolysis. A final robotic dis-assembly device separates the top chamber plate and lens molds in the mold carrier plate, to provide fully hydrated lenses in a concave lens mold ready for transfer to inspection and packaging stations. Following inspection of the lens, the concave lens mold is dosed with saline and used to form part of the package used to distribute the lens.

8 Claims, 26 Drawing Sheets

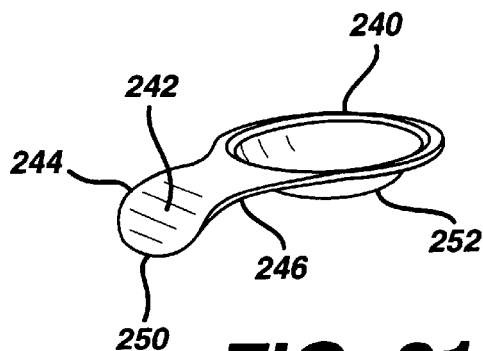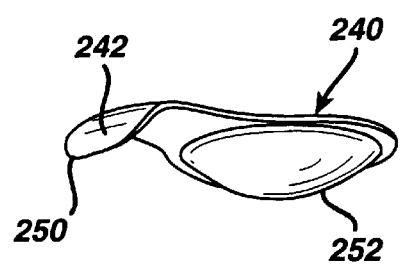
FIG. 21a  FIG. 21b
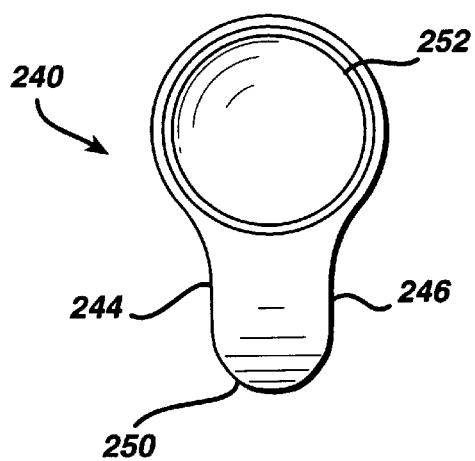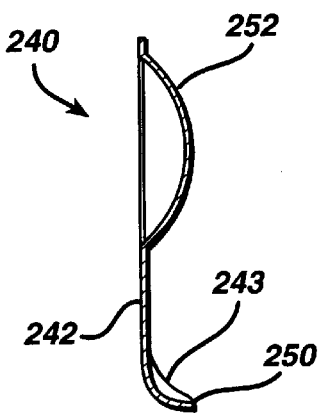
FIG. 21c  FIG. 21d
FIG. 22
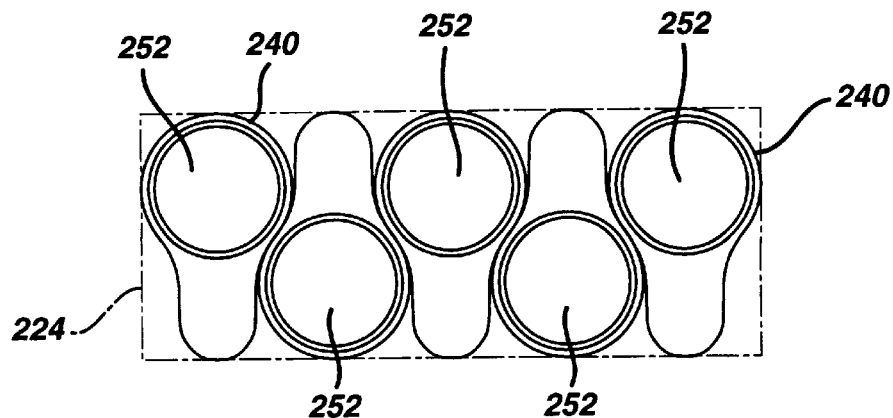

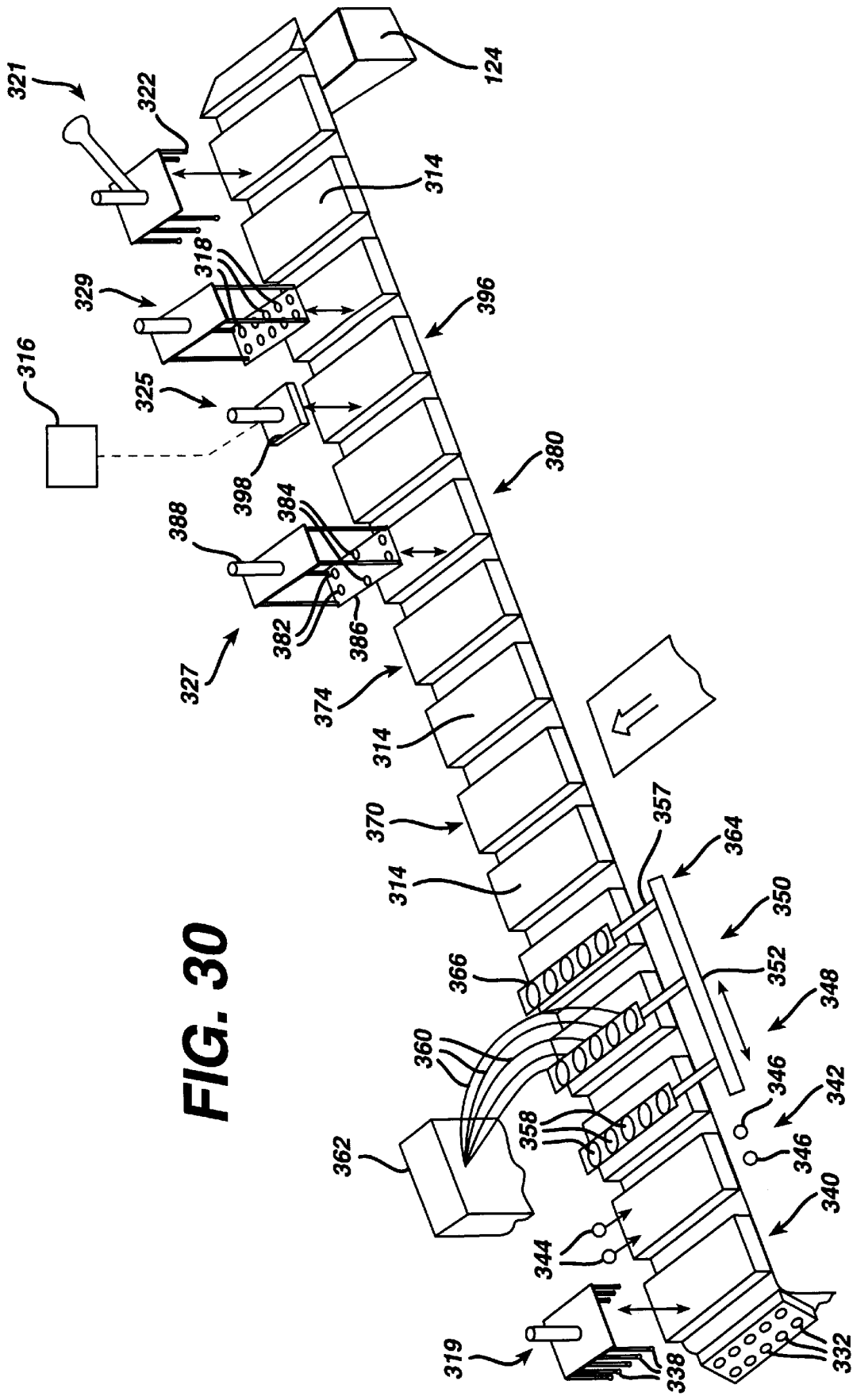

AUTOMATED METHOD AND APPARATUS FOR SINGLE SIDED HYDRATION OF SOFT CONTACT LENSES IN PACKAGE CARRIERS

CROSS REFERENCE TO RELATED APPLICATIONS

This application is a divisional application of U.S. patent application Ser. No. 08/696,402, filed Aug. 14, 1996, now U.S. Pat. No. 6,012,471, which is a continuation-in-part application of U.S. patent application Ser. No. 08/432,935, filed May 1, 1995, now U.S. Pat. No. 5,640,980, which is a continuation-in-part applications of U.S. patent application Ser. No. 08/258,556, filed Jun. 10, 1994, now U.S. Pat. No. 5,476,111.

FILED OF THE INVENTION

The present invention relates generally to the field of manufacturing ophthamalic lenses, especially molded, hydrophilic contact lenses, and more specifically, to a high speed automated method and apparatus for demolding and hydrating the lenses after polymerization.

DESCRIPTION OF THE PRIOR ART

The molding of hydrophilic contact lenses is disclosed in U.S. Pat. No. 4,495,313 to Larsen, U.S. Pat. No. 4,565,348 to Larsen, U.S. Pat. No. 4,640,489 to Larsen et al., U.S. Pat. No. 4,680,336 to Larsen et al., U.S. Pat. No. 4,889,664 to Larsen et al., and U.S. Pat. No. 5,039,459 to Larsen et al., all of which are assigned to the assignee of the present invention. This prior art discloses a contact lens production process wherein each lens is formed by sandwiching a monomer or a monomer mixture between a front curve (lower) mold section and a back curve (upper) mold section, carried in a 2×4 mold array. The monomer is polymerized, thus forming a lens, which is then removed from the mold sections and further treated in a hydration bath and packaged for consumer use. During polymerization, particularly of the hydrogels, the lens tends to shrink. To reduce shrinkage, the monomer is polymerized in the presence of an inert diluent like boric acid ester as described in the above patents, which fills up the spaces in the hydrogel lens during polymerization. The diluent is subsequently exchanged for water during the hydration process.

The prior art process of exchanging the diluent for water and hydrating the lens has been very time consuming. The two part molds are opened and the lenses are assembled in large groups and placed in a leaching tank for several hours. The leach tank includes heated water, small amounts of surfactants and salts. When the lenses are inserted in the leach tank they immediately expand in the presence of water and release from the mold in which they were molded. The boric acid ester diluent hydrolyzes into glycerol and boric acid thereby permitting the water in the matrix of the lens to exchange the diluent for water to hydrate the lens.

Salts and a pH buffer are used in the water so that the water placed in a lens has an osmolality and pH substantially similar to that of human tears so that the lens will not irritate the eye when it is inserted by the user. If the polymer from which the lens is made has ionic characteristics, the buffer neutralizes any ionic species in the lens. That neutralization causes temporary destabilization of the dimensions of the lens and requires an extended period of time to complete.

The lenses are then transferred to a rinse tank where removal of diluent and surfactant continues for another extended period of time. The lenses are when transferred to a large equilibration tank filled with heated water and salts for completion of diluent and surfactant removal and equilibration of the lenses for several more hours. The equilibration step entails completion of the neutralization of any ionic species in the polymer from which the lens is made. The lens is then removed from the equilibration tank and rinsed in clean saline and transferred for inspecting and packaging.

U.S. Pat. Nos. 5,080,839 and 5,094,609 disclose respectively a process for hydrating soft contact lenses and a chamber for hydrating contact lenses which represent a substantial improvement over the foregoing prior art process. These patents teach the use of a unique chamber formed of a male and female member which forms a hydration cavity which permits the hydration of the lens without permitting it to invert or roll over. Fluid flow is introduced into the cavity about the lens from each side to extract leachable material from the lens. The process significantly reduces the amount of leaching fluid that is used and the amount of time that is needed for hydration, washing and extraction. The apparatus disclosed in these patents enabled placement on a frame suitable for automated handling. The process significantly reduced the through-put time by hydrating the lens and releasing the lens from the mold cavity with deionized water and a small amount of surfactant without any salts, so that the time consuming ionic neutralization of the polymer from which the lens blank is made does not occur during the hydration process. When deionized water is used, the final step of the process is to introduce buffered saline solution into the final package with the lens and then sealing the lens within the package so that final lens equilibration (ionic neutralization, final hydration and final lens dimensioning) is accomplished in the package at room temperature or during sterilization.

As taught in these prior art references, the use of deionized water is an important step in this process because it allows the time consuming ionic neutralization to be done essentially outside the hydration process after the lens has been packaged and sealed.

It is also known, as taught for example in U.S. Pat. No. 5,143,660, to cast and polymerize a soft contact lens between two plastic mold parts, and then to use one of the two mold parts as a package carrier for hydration and final packaging. As taught in this patent, saline solution is added to the mold part to hydrate the lens, and the lens is then sealed in the mold part without inspection.

U.S. Pat. Nos. 4,955,680 and 5,036,971 both disclose a similar process for casting and polymerizing a soft contact lens in a mold that is also used as a package carrier, hydrating the lens with saline solution, and then sealing the lens in the mold, with saline, for final distribution. This reference also teaches decreasing the concentration of the saline liquid in successive aliquots of fluid to avoid the risk of stress cracking the lens. Again, no inspection of the lenses is contemplated in these references.

While the molds and processes described in the foregoing patents discuss automated handling of the lens during hydration, suitable automated equipment to handle these chambers at high production rates and implement this process in a fully automated apparatus was not readily available or taught by the prior art.

SUMMARY OF THE INVENTION

It is therefore an object of the present invention to provide an automated process and apparatus that will enable high production rates in the hydration process of a soft contact lens wherein one of the mold parts used to form the lens is used to hydrate and package the lens.

It is a further object of the present invention to provide a high speed robotic apparatus to facilitate the handling and manipulation of lens molds having a molded hydrophilic contact lens therein and a in a high through-put, high production rate automated apparatus.

It is an object of the present invention to provide an automated means for hydrating a molded hydrophilic contact lens wherein a first robotic assembly removes a plurality of contact lens molds from a production line carrier, wherein each of the lens molds has a contact lens adhered thereto. The first robotic assembly transports the molds to a first staging area where the lens molds are sandwiched between a lens mold carrier and a top chamber plate to form a first hydration carrier. In this carrier, one of the mold parts forms part of the hydration chamber. This hydration carrier is then transported through a plurality of flushing or extraction stations wherein fresh deionized water is introduced into the hydration chambers at each hydration station to flush leachable substances from the hydration chamber. During transit travel between flushing stations, the residual fluid in the mold chamber extracts impurities from the contact lens through mass transfer exchange. At each flushing station, recycled or fresh deionized water is introduced into the mold chamber to remove previously extracted impurities and the products of hydrolysis. A final robotic dis-assembly device separates the top chamber plate from the molds and the mold carrier plate, to provide fully hydrated lenses in their molds ready for transfer to inspection and packaging stations, wherein the mold serves as an inspection carrier and a package carrier for packaging the lens.

It is an object of the present invention to provide a method and apparatus for hydrating soft contact lenses that will avoid the necessity for direct handling of the soft, wet and slippery contact lenses.

It is also an object of the present invention to provide a hydration chamber which will allow hydrating of the lens without physically damaging the lens, losing the lens, or allowing it to invert or roll over in the hydration carrier.

It is further an object of the present invention to provide a robotic handling device that will quickly and efficiently handle a large number of discreet individual molds having a molded contact lens therein.

It is another object of the present invention to provide an automated control means for sequencing and coordinating each of the robotic assemblies used in the transfer of lenses from the production line pallet, through the hydration and extraction stations, and finally to an inspection carrier.

While the invention is described with particular reference to molded contact lenses wherein the lens is molded between a first and second mold half, it is understood that the invention and the use of the package carrier to hydrate the lens is equally suitable for the hydration of lenses formed by lathe cutting wherein the hydrogel is maintained in a dry state while the desired optical surfaces are formed, and may be used with spin cast lenses which subject a liquid monomer to a centrifugal force in a mold which has the same shape as the desired optical surface of the lens.

It is an object of the present invention to provide an automated process and apparatus for hydrating contact lenses where the volume of solution used to release and hydrate the lens is significantly reduced, and to significantly reduce the quantity of chemicals used in the hydration process.

It is another object of the present invention to provide a high speed automated apparatus and method to remove leachable substances with water, alcohol, or other organic solvents, or a mixture thereof, thus flushing unreacted monomers, catalysts and/or partially reacted comonomers, diluents or other impurities from a hydrophilic contact lens.

Finally, it is an object of the present invention to provide a high speed automated method and apparatus for hydrating contact lenses formed in an automated production line as more fully described in application Ser. No. 08/258,655, "Consolidated Contact Lens Molding".

BRIEF DESCRIPTION OF THE DRAWINGS

The foregoing objects and advantages of the present invention for an automated method and apparatus for hydrating soft contact lenses may be more readily understood by one skilled in the art with reference being had to the following detailed description of the preferred embodiments, taken in conjunction with the accompanied drawings, wherein like elements are designated by identical reference numerals throughout the several views, and in which:

FIGS. 21(a) through 21(d) illustrate another embodiment of a mold part that may be used as a base member in a package carrier in a manner similar to that disclosed in FIGS. 18 through 20 of the drawings above.

FIG. 22 is a top plan view of an array of blister packages utilizing the mold part or base member of FIG. 21, when assembled for package sealing.

FIG. 30 is a diagrammatic view of a packaging arrangement that may be used to dose individual mold packages with saline solution and to seal a foil cover strip thereto.

DETAILED DESCRIPTION OF THE PREFERRED EMBODIMENTS

Figure 1:
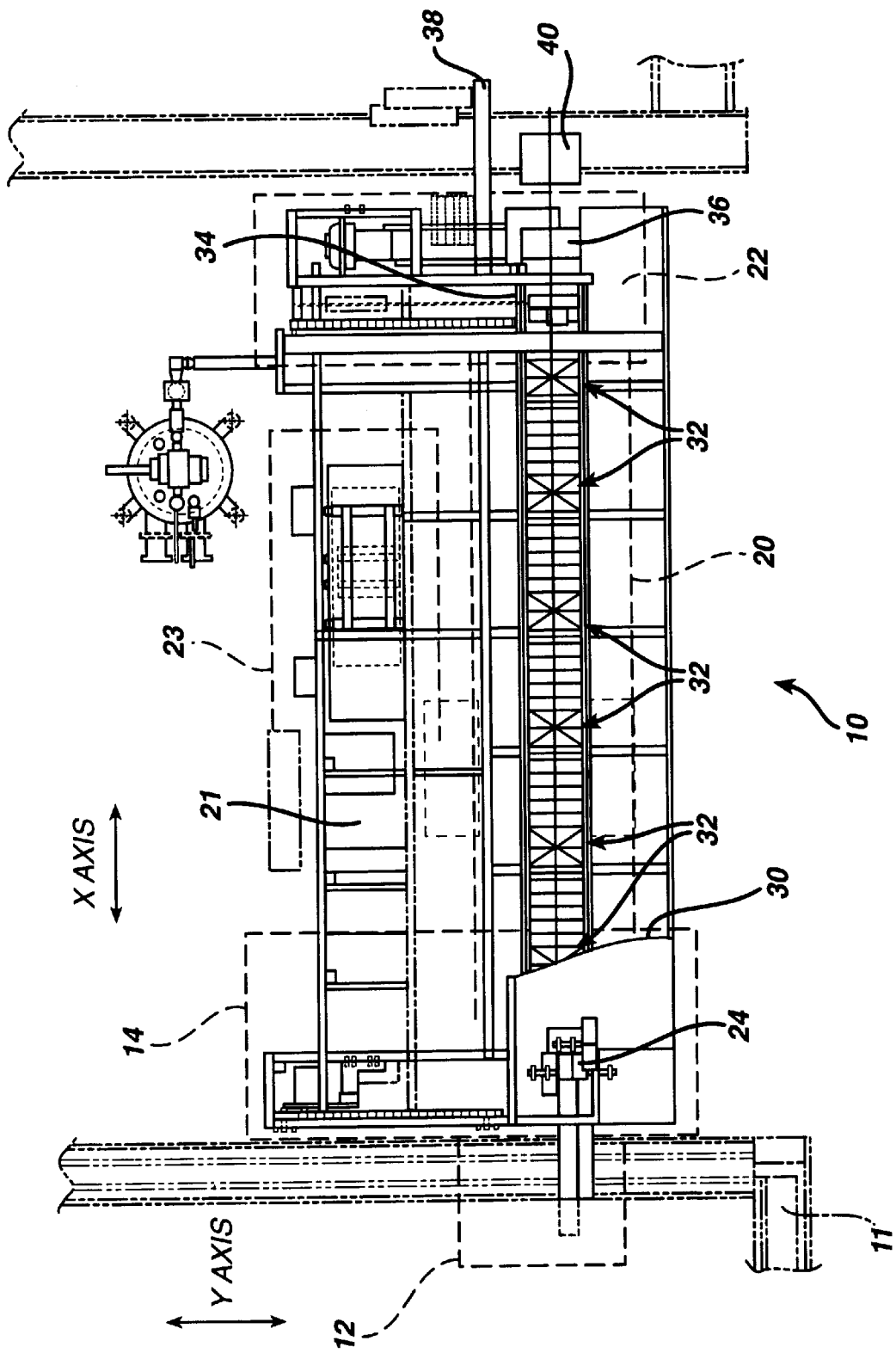
FIG. 1 is a top plan view of the apparatus of the present invention illustrating in block form the arrangement and relative location of each of the robotic handling devices of the present invention.

The present invention is an automated method and apparatus for hydrating soft contact lenses, especially molded hydrophilic contact lenses manufactured in two-part molds in the presence of a diluent and then polymerized in the presence of a catalyst with ultraviolet light. After the polymerization process is completed, the two halves of the mold are separated or demolded with the contact lens preferentially adhered to the front curve mold half, as more fully described in application Ser. No. 08/258,155 filed Jun. 10, 1994 entitled "Consolidated Contact Lens Molding" the disclosure of which is incorporated herein by reference thereto.

While the invention described herein is preferentially utilized in combination with the automated production line disclosed therein, it is understood that the present invention is equally suitable for the hydration of lenses formed by lathe cutting wherein the hydrogel is maintained in a dry state while the desired optical surfaces are cut and polished, or with contact lenses formed by the spin cast method wherein a liquid monomer is subjected to centrifugal force in a mold which has the same shape as the desired optical surface of the lens.

The description of the present invention is provided within an automated production line in which the contact lenses are preferentially adhered to the front curve mold half, but it is understood that the invention could be employed in an automated production line apparatus which separates the molds in such a manner as to preferentially retain the lens on the back curve mold half. In this embodiment, the backcurve mold half and lens would be superimposed over the final package base, and the lens would be continually immersed in an aqueous solution in the package base member for hydration and extraction. The hydration of the lens would result in the release of the lens from the back curve mold half, and the remaining extraction dosing and sealing steps would be completed in the package base member. If the lens is to be inspected, the aqueous solution is deionized water, but if the lens is not to be inspected, the aqueous solution can be either deionized water or buffered saline solution.

The present invention is also an improved and simplified form of the apparatus illustrated in the two parent applications, U.S. Ser. No. 08/258,556 and U.S. Ser. No. 08/432,935, both of which are entitled "Automated Method and Apparatus for Hydrating Soft Contact Lenses", the disclosures of which are incorporated herein by reference thereto.

The present invention is particularly suited to the hydration of hydrophilic contact lenses formed from monomer and monomer mixtures which include copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryliccid, glyceryl methacrylate, and dimethylaino ethylacrylate.

Preferred polymerizable compositions are disclosed in U.S. Pat. No. 4,495,313 to Larsen, U.S. Pat. No. 5,039,459 to Larsen et al. an U.S. Pat. No. 4,680,336 to Larsen et al., which include anhydrous mixtures of a polymerizable hydrophilic hydroxy ester of acrylic acid or methacrylic acid and a polyhydric alcohol, and a water displaceable ester or boric acid and a polyhydroxyl compound having preferably at least 3 hydroxyl groups. Polymerization of such compositions, followed by displacement of the boric acid ester with water, yields a hydrophilic contact lens.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to catalyze the polymerization reaction, optionally with the addition of a polymerization initiator. Representative initiators include camphorquinone, ethyl-4-(N,N-dimethyl-amino) benzoate, and 4-(2-hydroxyethoxy) phenyl-2-hydroxyl-2-propyl ketone.

Polymerization of the monomer or monomer mixture in the mold assembly is preferably carried out by exposing the composition to polymerization initiating conditions. The preferred technique is to include in the composition, initiators which work upon exposure to ultraviolet radiation; and exposing the composition to ultraviolet radiation of an intensity and duration effective to initiate polymerization and to allow it to proceed. For this reason, the mold halves are preferably transparent to ultraviolet radiation. After the precure step, the monomer is again exposed to ultraviolet radiation in a cure step in which the polymerization is permitted to proceed to completion. The required duration of the remainder of the reaction can readily be ascertained experimentally for any polymerizable composition.

After the lens has been polymerized, it is demolded in preparation for the hydration process. The hydration process of the present invention is used to hydrolyze the diluent used in the monomer or monomer mixture and then extract or leach from the lens the products of hydrolysis, together with unreacted or partially reacted monomer or inhibitors, surfactants from the lens. In the hydration step, a plurality of lenses, still adhered to one of the mold parts in which they were formed, are covered or immersed with deionized water having a small amount of surfactant therein. This hydration step hydrolyses the boric acid ester used as a diluent in the lens into glycerol and boric acid which is then exchanged by the physical phenomenon of mass transfer by the concentration gradient of the products of hydrolysis between the contact lens and the deionized water at the surface of the lens.

Simultaneously, the lens, in the presence of deionized water and surfactant, swells, creating a shear force with respect to the mold in which the lens was formed thereby separating the contact lens from the mold. The lens remains in the mold part while deionized water is introduced through a hydration element to periodically flush the mold and permit extraction of impurities from the contact lens. As the extraction continues, the concentration gradient between the lens and each batch of fresh deionized water diminishes, and it is therefore useful to provide a residence time between each of the extraction stations. In the preferred embodiment of the invention, extraction is carried out in a series of discreet steps. Fresh deionized water may be introduced into the hydration cavity continuously or in a batch process, wherein the deionized water is introduced for approximately 2 seconds, with a residence time for leaching or mass transfer exchange of approximately 72 seconds between each extraction or washing station. In a preferred embodiment, the initial station or stations continuously introduce deionized water into the mold while later stations use step-wise extraction. After the step-wise extraction steps, the products of hydrolysis and monomers have been reduced below detectable levels.

In the process for the present invention, the wet contact lens remains in the mold part and is not transferred or touched by any mechanical device. This avoids direct mechanical handling of the lens thereby minimizing physical damage to the lens.

THE MOLD PART PACKAGE CARRIER

Figure 19A:
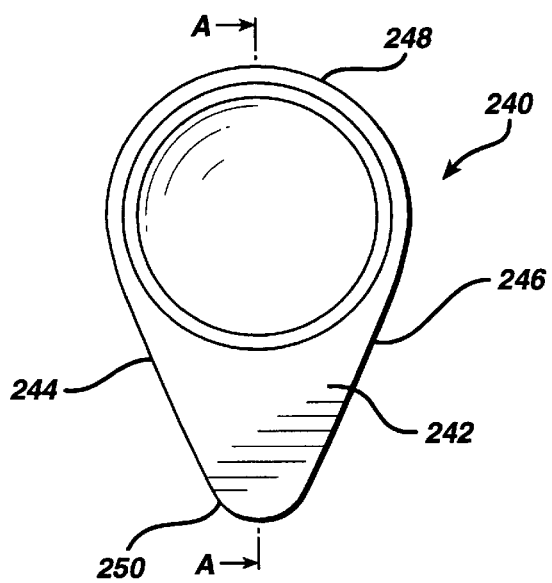
FIG. 19(a) illustrates a top plan view of a mold part that may be used to mold a soft contact lens and also used as the base member of the mold package illustrated in FIG. 18.

The mold package that may be used to mold, hydrate and package the contact lens is illustrated in FIGS. 19a, b and 20a–d in which the mold package 240 defines a mold cavity 252 for molding the lens. Typically, this mold part defines the front curve of the lens and the optical power of the lens. A planar flange 242 surrounds the cavity 252 and possesses a configuration having converging side walls 244, 246 extending along opposite sides of a longitudinal centerline, wherein the walls 244, 246 may be either straight or curved. At a wider space portion between the walls, these extend into a generally hemispherical convex end 248, and also a convexly rounded end 250 at the narrower end portion thereof. Formed in the flange surface and offset towards the wider end 248 of the planar flange 242 and essentially having a center point coinciding with the center of curvature of the wider end portion 48 is the mold cavity 252, as shown specifically in FIGS. 19a & b of the drawings, adapted to form a similarly-shaped contact lens (not shown) which is subsequently hydrated in this same cavity and then packaged in the cavity with a sterile saline solution. Moreover, the bottom surface of flange 242 may be provided with a rib or depression 243 extended along or proximate the periphery thereof so as to impart added strength and stiffness to the base member 240.

Figure 20A:
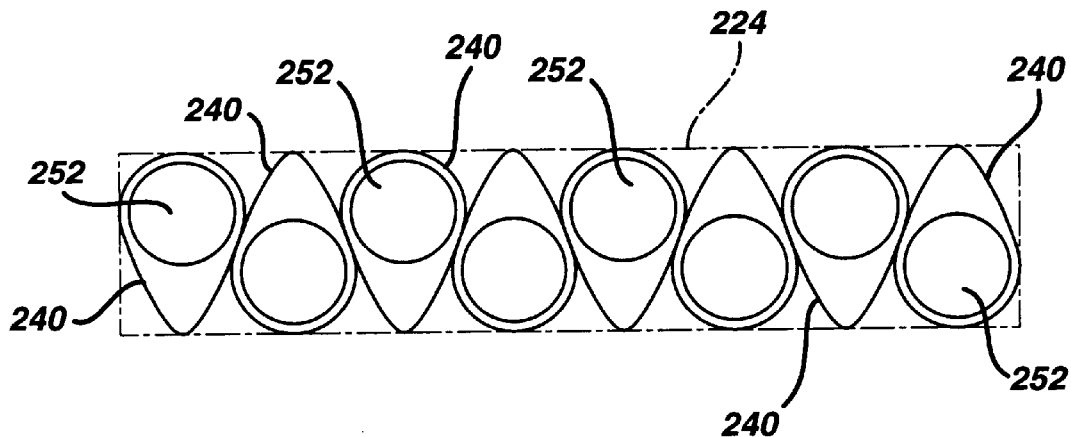
FIG. 20(a) illustrates a top plan view of an array of mold parts after conversion to mold packages pursuant to the invention.
Figure 20B:
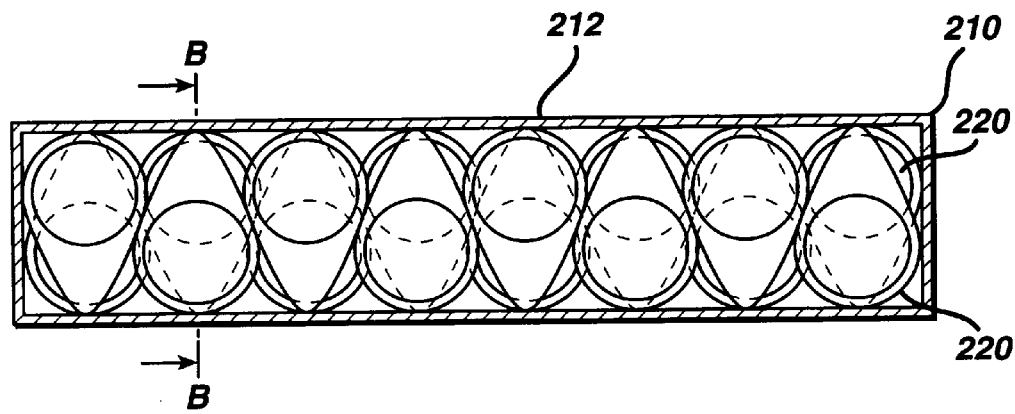
FIG. 20(b) illustrates diagrammatically a plurality of superimposed and inverted interleaved layers of arrays of molds after convertion to mold packages as they may be arranged within a carton structure.

A plurality of such these base members 240 for the packages 222 are then arranged in an alternatively reverse arrangement adjacent each other, as shown in FIGS. 20a and 20b, so that the converging side walls of contiguous base members are essentially in contact at least at one point, and with the mold cavities 252 being staggered relative to each other as shown in the drawings.

Figure 18:
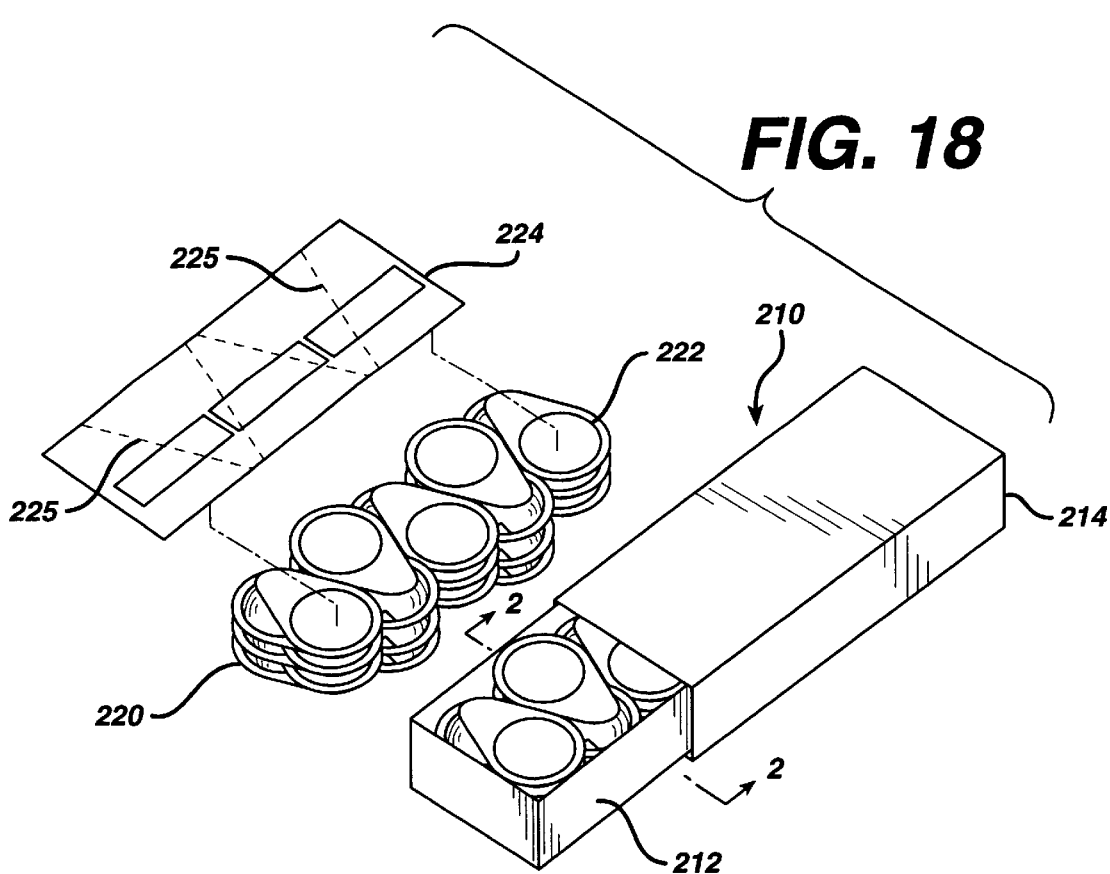
FIG. 18 illustrates, in an exploded perspective view, a plurality of superimposed arrays of packaging arrangements using one of the mold parts of the present invention in a mold package wherein a specific quantity of contact lenses are adapted to be stored in a suitable carton-like container.

FIG. 18 diagrammatically illustrated a rectangular carton 210, shown in a partially opened condition, wherein the carton 210 includes a lower or inner portion 212 having a storage space for the receipt of arrays of contact lens packages, including a top opening and incorporating side and end walls extending upwardly from a flat bottom wall, as known in the carton art, and which is adapted to be enclosed by a sleeve-like outer carton portion 214. The rectangular carton 210 is preferably constituted of paperboard as is well known in the carton manufacturing technology and is dimensioned so as to be able to receive a specified quantity of planar arrays of packaging arrangements for the sealed containment of contact lenses, especially disposable hydrophilic contact lenses (not shown), as described in more specific detail hereinbelow; although other materials, such as pressed cardboard, plastic and even more rigid durable materials, can be contemplated.

Furthermore, although shown as a so-called "matchbox" carton, the latter may be a carton having an openable lid or cover portion; for example, as disclosed in copending U.S. patent application Ser. No. 08/146,754 (Attorney's Docket No. VTN-90, 9014), the disclosure of which is incorporated herein by reference.

As is illustrated, the carton 210, as is known in the art may be provided with a decorative glossy or semi-glossy exterior surface, which may be imparted with suitable single or multi-colored imprinting and/or embossing representative of the product contained therein identifying legends and logos pertaining to the company manufacturing and/or marketing of the product, instructions pertaining to the use of the product packaged in the carton, and other suitable legends including product batch numbers and manufacturing dates and other decorative indicia and the like.

In the practice of the present invention, one of the mold parts used to mold the contact lens are also used to package the lens. As is shown in the perspective view of FIG. 18 and also in the sectional view shown in FIG. 20(*c*) of the drawings, a plurality of arrays 220 of interconnected mold packages is located in the lower carton portion 212. Each mold package 222 of an array 220, as represented in further detail hereinbelow, includes a base member consisting of a planar essentially wedge or teardrop-shaped flange 242 having semi-circularly outwardly curved end portions, and wherein off-set towards the wider end of the planar flange, there is formed a cavity 252 of an essentially semi-spherical configuration. The cavity 252 is configured to form the front curve optical power of a contact lens, and after molding and hydration is adapted to store therein a contact lens in a sealed condition while immersed in a suitable sterile aqueous solution.

Referring to FIGS. 20*a* and 22 of the drawings, the strips of mold packages 220 are essentially constituted of a plurality of lens forming and packaging cavities, and are injection molded or thermoformed as individual units, In the embodiment of FIG. 22, five mold packages 240 are secured together in a manner similar to the array of FIG. 18, and are adapted to be sealingly covered by flexible cover sheet 224, which includes suitable weakening lines or perforations 225 to enable access to individual of the cavities for removal of the contact lens therefrom.

The entire integral base member containing the plurality of mold package may be sealingly covered by a flexible cover sheet 224 which, in this instance, has weakening lines or perforations 225 adapted to be removed in sections to provide selective access to individual of the cavities for removing the contact lens therefrom. Each of the weakening lines 226 at the intersections thereof may be provided with suitable areas of non-sealing property to enable the user to grippedly engage that portion of the flexible cover sheet and detach that segment from the remaining cover sheet so as not to adversely influence the integrity of the contact lenses sealingly contained in the remaining cavities.

This will enable a suitable detachment, from the array 220, of individual mold packages 222, each containing a single contact lens. The flexible cover sheet 224 is secured to suitable regions of the surface of the flanges of each base member of a mold package facing the cover sheet, such as by heat sealing, ultrasonic sealing, adhesives or other acceptable methods so as to at least encompass in a sealing manner each mold containing a respective contact lens immersed in a sterile aqueous solution and to provide a sealing containment for each contact lens in its respective mold cavity. Other sealing locations may be provided in suitable areas or points as desired between the facing surfaces of the flexible cover sheet and that of the flange of each base member so as to provide adequate regions of adherence therewith, while permitting various edge portions between the flexible cover sheet and flange components to remain unattached in order to facilitate a finger-gripping engagement and enable separating the severed cover sheet portion from its associated base member, thereby providing for access to the contact lens which is contained in the applicable cavity thereof.

A suitable mechanism for adding a saline dose to each mold cavity and sealing an array of mold cavities to a single cover sheet is diagrammatically illustrated in FIG. 30, and more completely described in U.S. Ser. No. 08/431,891 entitled "Packaging Arrangement which is commonly assigned to the assignee of the present invention, the disclosure of which is incorporated herein by reference thereto.

The flexible cover sheet is preferably constituted of a laminated foil, barrier film layered to other plastic, metalized or further layers, or other suitable material structure; for example, comprising a polypropylene film, possibly a PET film, on at least one external surface thereof adapted to contact the facing surface of the flange of each respective base member of a mold package 222, so as to enable adhesive or heat sealing therewith, as mentioned thereof. The laminated foil constituting the flexible cover sheet may be of a multi-layered construction having suitable double-sided imprinting provided thereon; for example, as disclosed in copending U.S. patent application Ser. No. 08/106,386, which is commonly assigned to the assignee of the present application.

Figure 20C:
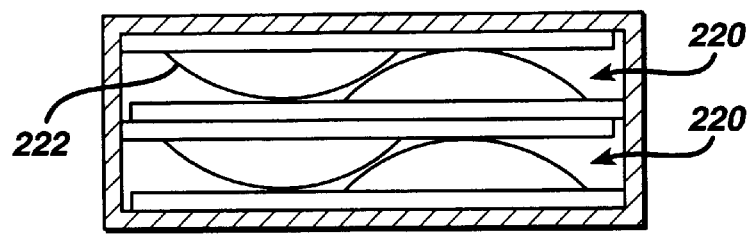
FIG. 20(c) illustrates a sectional view taken along line B—B in FIG. 20(b).

As disclosed herein, as shown in FIGS. 18, 20*b* and 20*c* of the drawings, the packaging arrangement is adapted to provide for a packaged supply of large quantities of disposable hydrophilic contact lenses, each of which is intended to be used for only a specified period of hours within a single day, and then discarded; in effect, requiring the carton to be able to store contact lenses each in a sterile sealed condition in each one of the cavities of the respective mold packages so as to be individually dispensable.

Different sizes of carton constructions, each containing various specified quantities of arrays of mold packages with each having respectively a contact lens immersed in a sterile aqueous solution, may be provided in accordance with specific requirements of consumers. Thus, there may be provided different numbers of arrays of contact lenses varying in quantity and positioning within any specific carton so as to provide supplies of lenses for a consumer for various lengths of time extending over periods of days, weeks or even months, as elucidated hereinbelow in more specific detail.

Figure 19B:
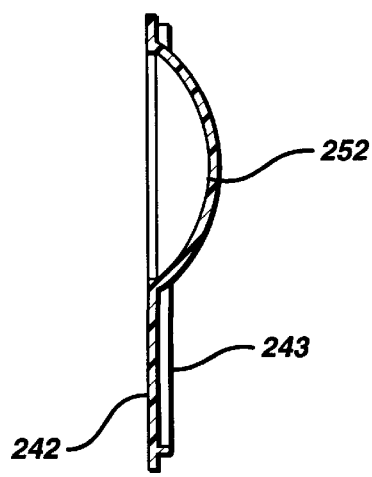
FIG. 19(b) illustrates a sectional view taken along line A—A in FIG. 19(a).

Referring to the modified embodiment of a base member 240 as illustrated in FIGS. 21 and 22 of the drawings, in which the reference numerals are the same in identifying components similar to those of FIGS. 19 and 20, in this instance the primary distinction relative to the embodiment of FIGS. 19 and 20 resides in that the flange portion rather than being provided with converging sidewalls 244, 246 has the sidewalls narrowed and extending substantially in parallel. This generally defines the shape of a so-called "duckbill," terminating in a rounded and downwardly turned end portion 250 opposite to the wider end 248 in which the mold cavity 252 is located. If desired, the base member 240 of this embodiment may also be provided with a stiffening rib structure as previously illustrated in the embodiment of FIG. 19*b*.

The foregoing base member 240, in conjunction with other base members of similar configuration and a flexible cover sheet 224, as illustrated in FIG. 18 of the drawings may be assembled in specified arrays; for example, as shown in FIG. 22 of the drawings. In this instance, the arrays, which are generally planar in shape, may be of a plurality of rows and also include reversed and inverted superimposed arrays to provide the required quantity of blister packages each containing a contact lens in a secondary packaging.

SUMMARY OF HYDRATION

Figure 2:
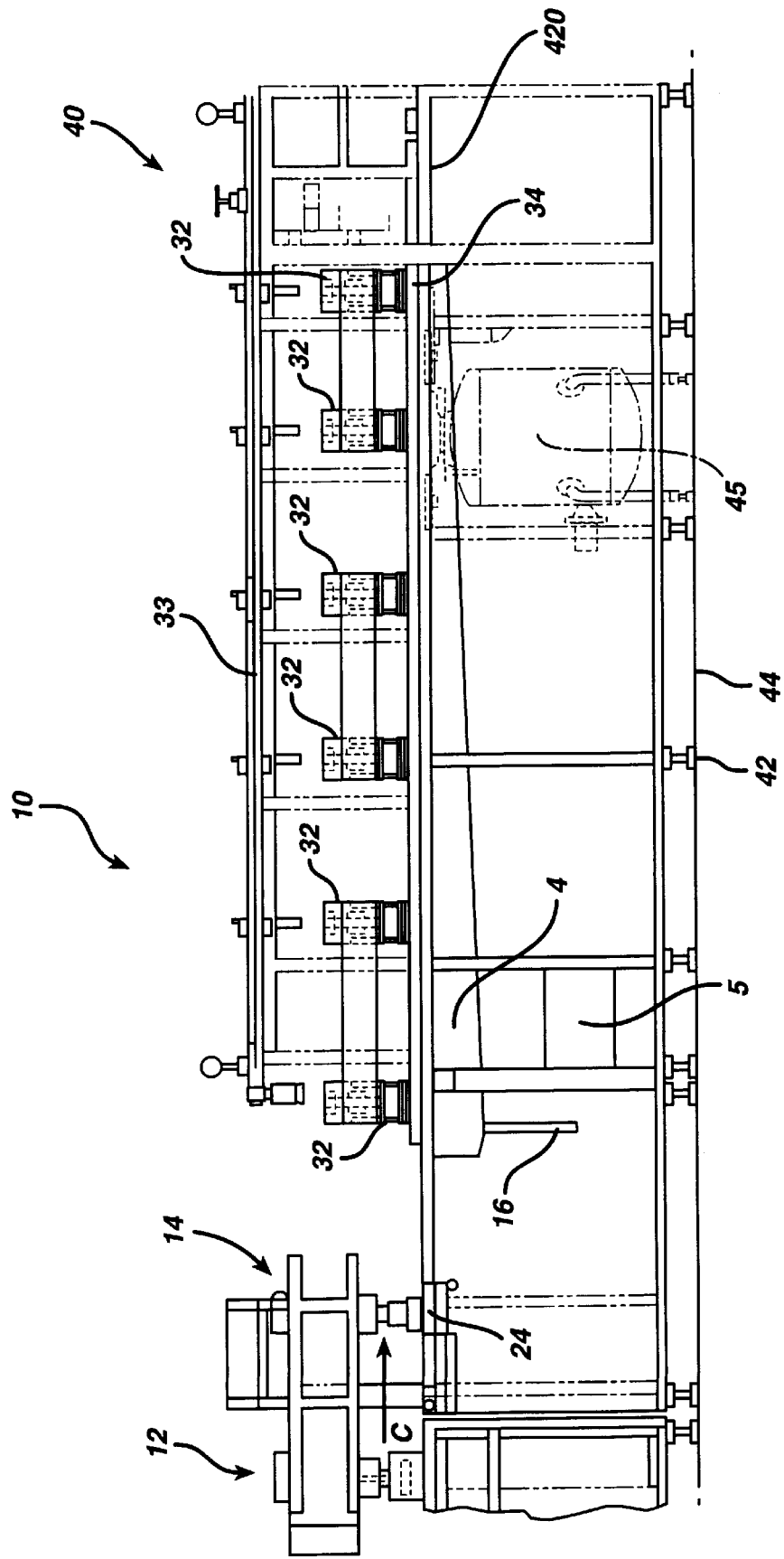
FIG. 2 is an elevation view of the apparatus illustrated in FIG. 1 illustrating in schematic form the principle components of the present invention.

FIGS. 1, and 2 illustrate the preferred embodiment of the automated means for hydrating a hydrophilic contact lens in the mold in which it was formed. As illustrated in FIG. 1 an automated production line having an output conveyor 11 supplies a plurality of pallets to a first robotic assembly which transfers the lens molds and contact lenses from pallets of the production line conveyor 11 to the hydration apparatus 10 of the present invention.

While any suitable pallet arrangement would be satisfactory, the invention is described with respect to hydration carriers that handle thirty-two molds and lenses at once, taken from four separate production pallets simultaneously. This arrangement achieves a suitable compromise between a desirable batch size and convenient robotic handling, although it is understood that a variety of pallet configurations and lens arrangements would be suitable, depending on the output rate and configuration of the contact lens production line.

For the purposes of explanation, the term X axis will refer to the horizontal axis of FIG. 1 (the linear axis), the Y axis will refer to the vertical axis of FIG. 1 (the cross axis), and the Z axis will be perpendicular to the plane of FIG. 1 (the vertical axis).

Prior to the transfer of the lens mold and contact lenses from the production line conveyor 11, a first assembly device generally denoted by the dotted line box 14 in FIG. 1, transports a lens mold carrier plate from the return conveyor 21 to a staging area 24 to provide a carrier for receiving the individual lens molds and the associated contact lenses from the production line conveyor 11. The first assembly device will be described in greater detail with respect to the description accompanying FIGS. 13–15. In summary, the assembly device makes a first trip in the Y axis to bring the lens mold carrier plate to the staging area 24, and then deposits the carrier plate with a short Z axis stroke. The first robotic assembly, delineated by the dotted line box 12 in FIG. 1, and more fully described in FIGS. 14 & 15, transfers the individual contact lens molds and associated contact lenses from the mold pallets on conveyor line 11 to the lens mold carrier at the staging area 24 with an X axis movement and a short Z axis stroke to deposit the lens molds in the lens mold carrier plate. The first assembly device, located in dotted line box 14, then makes a second return stroke in the Y axis and deposits a top chamber plate on the assembled lens molds and carrier plate to form a hydration assembly.

The hydration assembly is then moved by a short stroke cylinder in the X axis to an intermediate staging position, and then advanced by a short stroke index conveyor 30 through the extraction line enclosed within dotted line box 20 of FIG. 1. The extraction line of FIG. 1 includes six extraction stations 32, each of which moves in a Z axis to hydrate the contact lens and to flush and extract leachable compounds from the contact lens. The extraction stations will be further described and illustrated in FIGS. 23–25 of the drawings. After the hydration, flushing and extraction is completed, the top chamber plate is removed by a robotic disassembly device generally located in the dotted line box 22 of FIG. 1. The robotic disassembly device removes top chamber plate with a short Z axis stroke and then a long Y axis stroke to carry the top chamber plate to the return conveyor line 21. The mold carrier plate, with molds and the contact lenses therein, is then translated in the X axis to the final staging area 36. A robotic lens transfer device 38 then removes the individual molds and contact lenses from the mold carrier and transports them to a plurality of inspection carriers generally located at 40 in FIG. 1. Alternately, the mold carrier plate, and the molds and lenses carried therein, could be translated to an optical inspection area for transport of the molds and lenses through the inspection station. After the base carrier has been emptied of molds and contact lenses, it is moved in the Y axis as illustrated in box 22 of FIG. 2 to be returned to the return conveyor 21. The robotic disassembly device will be more fully described hereinafter with respect to FIGS. 26–29 of the drawings. The top chamber plate and the mold carrier are sequentially washed and cleaned in a wash station generally indicated in the dotted line box 23 of FIG. 1. The timing and relative interaction of the various robotic assemblies and devices is determined by a programmable logic controller located in control means 5, symbolically illustrated in FIG. 2.

Figure 3:
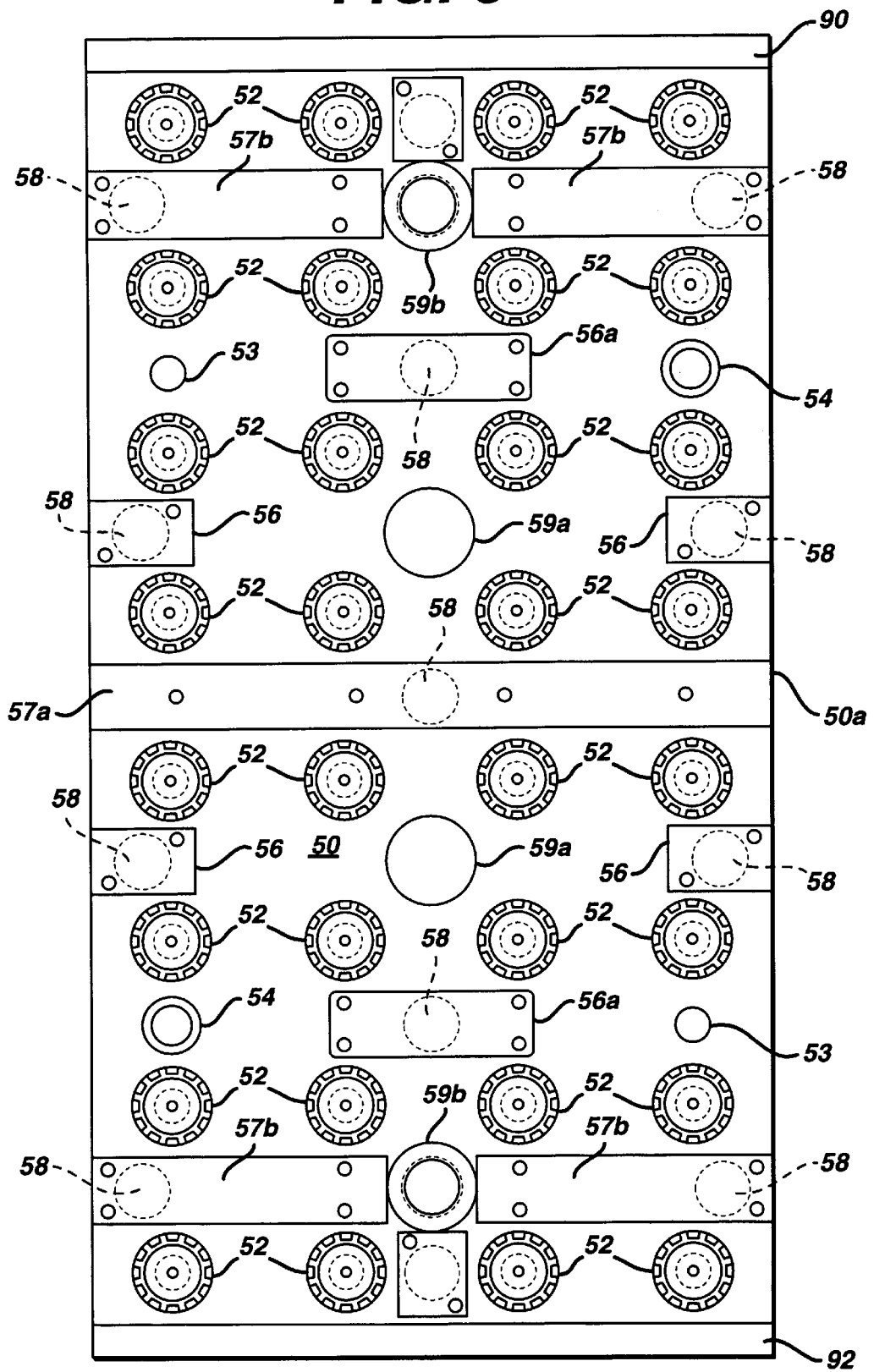
FIG. 3 is a plan view of the top chamber plate which is utilized as a lens retaining device in the present invention.

FIG. 2 is an elevation view of the hydration apparatus 10 which illustrates in diagrammatic form, some, but not all of the major components of the present invention. As illustrated in FIG. 3, the first robotic assembly, generally indicated at 12 carries a plurality of contact lens molds and contact lenses from the production line conveyor 11 to the assembly staging area 24. The robotic assembly device 14 provides the lens mold carrier plate and the top chamber plate that are used to create the first hydration carrier which is assembled at assembly area 24.

Hydration of the lenses is accomplished with deionized water having a small amount of surfactant therein, which is fed into the individual mold halves, and is kept normally at a constant temperature of 70–80° C. by virtue of a thermostatically controlled heater in or in a closed loop with tank 45. Tank 45 is also used to accumulate and pressurize deionized water for use in the hydration apparatus. The deionized water is distributed along a manifold 33, which may be a recirculating manifold to maintain the desired temperature, to the various station of the assembly. FIG. 2 also illustrates six extraction stations 32 which are also supplied with the deionized water from a common manifold 33. Alternately, as will be described with respect to FIG. 25, one or more of the extration stations may use a continuously recirculating supply of deionized water, which may be refreshed via the discharge of a portion of the recirculating flow, which is refreshed with deionized water. A collection sump 4 is used to collect deionized waste water from the extraction stations 32 and provide the water for recirculation or to discharge the water through a drain pipe 4a to a floor drain.

THE HYDRATION CARRIER

Figure 6:
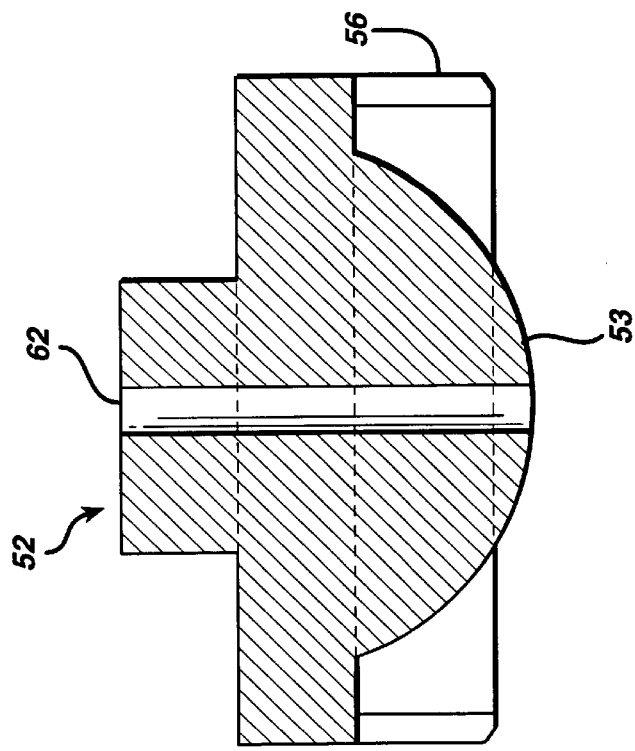
FIG. 6 is a cross-sectioned elevation view of the lens hydrating element illustrated in FIG. 5.
Figure 7:
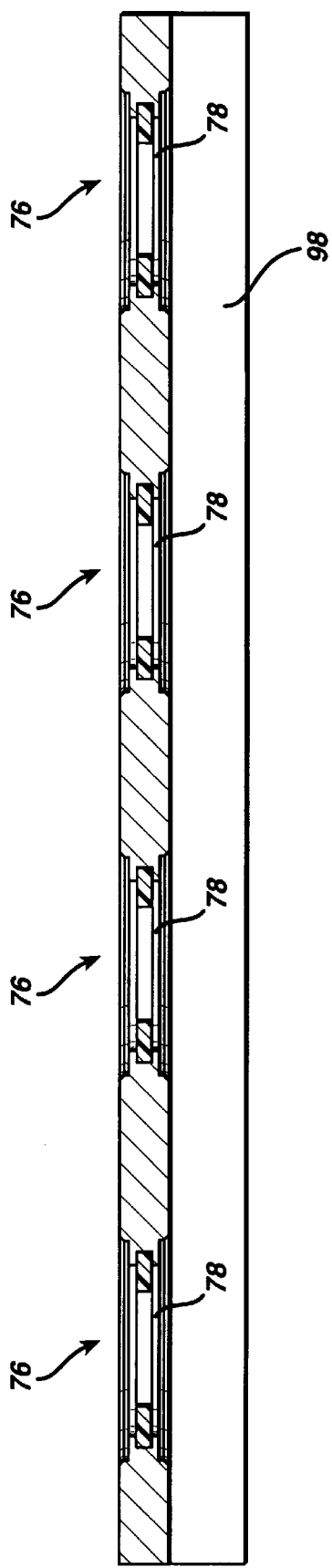
FIG. 7 is cross sectioned side or elevation view of a lens mold carrier utilized in the present invention.
Figure 8:
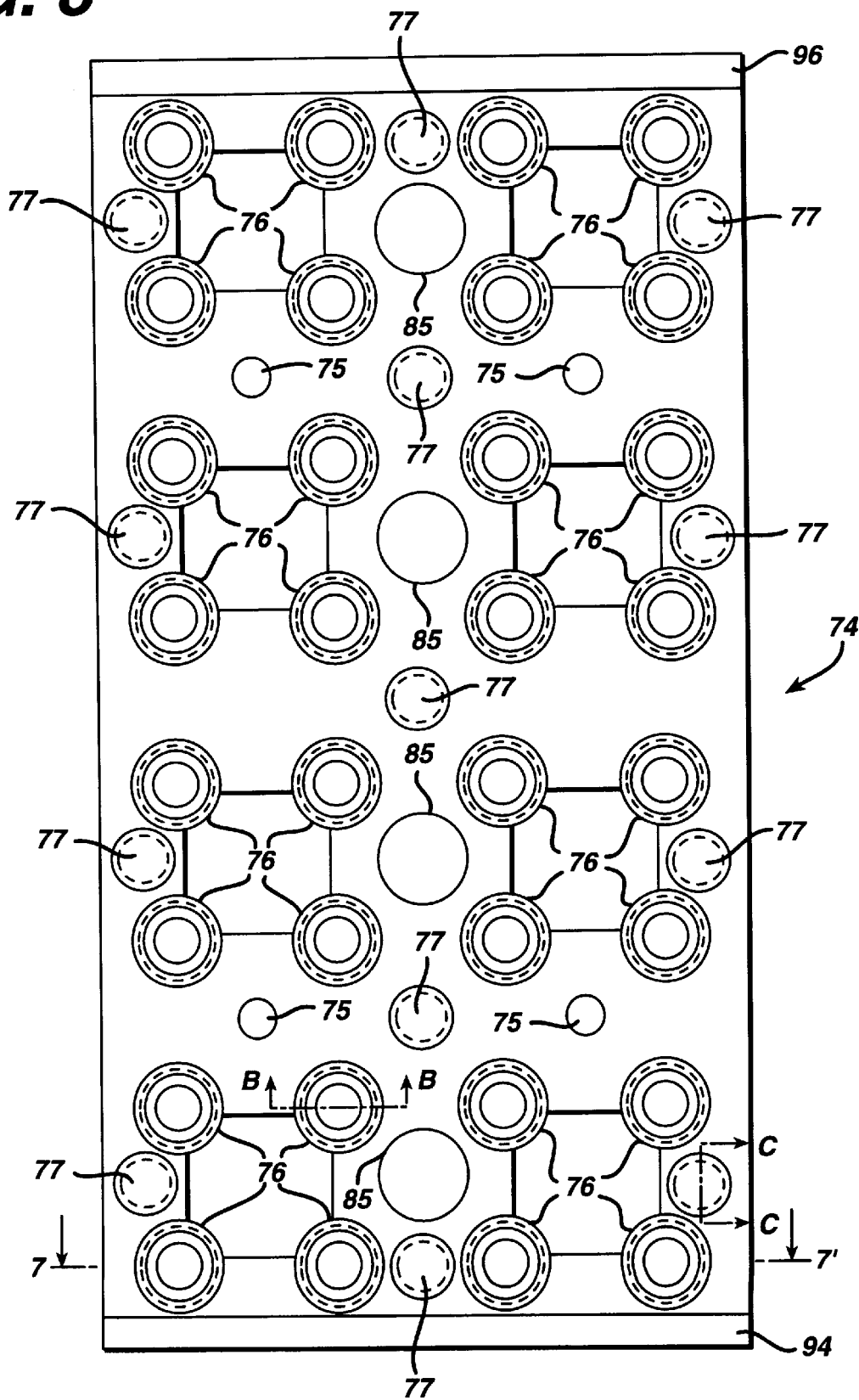
FIG. 8 is a top plan view of the lens mold carrier of FIG. 7 which may be used to receive the contact lens molds and lenses from the automated production line.
Figure 9:
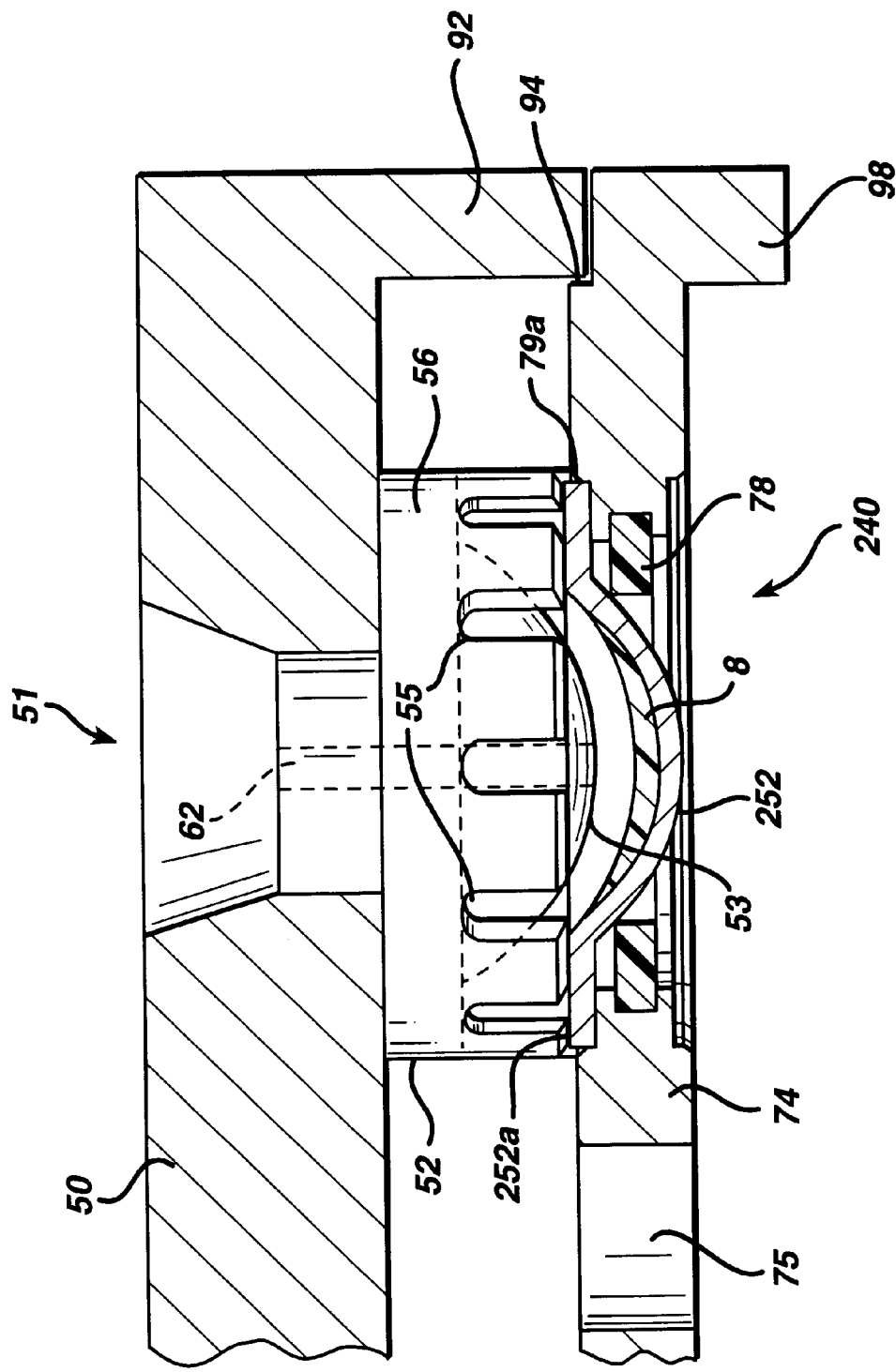
FIG. 9 is a partially cross-sectioned elevation view of a single lens hydration means of the first hydration carrier, formed by the top chamber plate of FIGS. 3 and 4, a contact lens mold with a contact lens secured therein and the lens mold carrier of FIGS. 7 and 8 which are assembled for transport through the hydration and extraction stations.

The hydration carrier is illustrated in FIGS. 3–12 in which FIG. 3 is a top or plan view of the top chamber plate, and FIG. 8 is a plan view of the lens mold carrier plate, which when mated together as illustrated in FIG. 9 forms the hydration carrier. FIG. 9 is a cross-section detail of a single hydration chamber of the hydration assembly.

Figure 4:
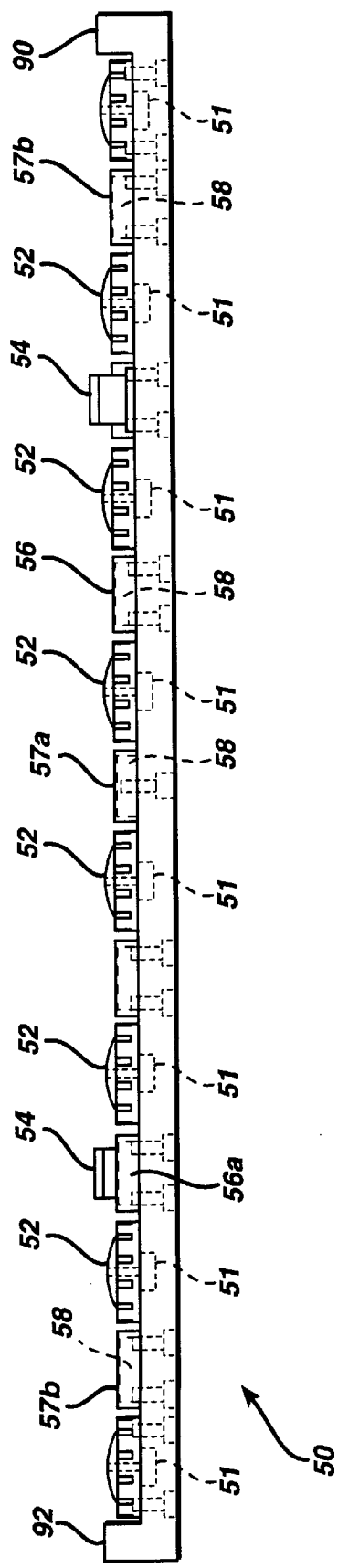
FIG. 4 is a side elevation view of the top chamber plate illustrated in FIG. 4.

As illustrated in FIGS. 3 and 4, the top chamber plate is illustrated in a plan and elevation view to facilitate the explanation thereof, while in FIG. 9, it is combined with the lens mold carrier plate in an assembled view. The top chamber plate 50 may be formed as metal such as hard coat aluminum, or plastic such as delrin or polycarbonate. The top chamber plate 50 includes a plurality of orifices 51 which are illustrated in FIG. 4. Each of the orifices 51 receives a single contact lens hydration means 52, thirty-two of which are illustrated in a 4×8 array in FIG. 3. The top chamber plate 50 also includes four drilled openings 53, two of which receive two registration pins 54 which are spaced diagonally on the top chamber plate. While four pins could be used, it has been found that two provide satisfactory results. Registration between the top chamber plate 50 and the mold carrier plate 74 may also be provided by peripheral flanges 90, 92 at either end of the top chamber plate 50. The flanges 90, 92 engage matching shoulder recesses 94, 96 formed in the downwardly extending legs of the mold carrier plate, one leg of which is illustrated at 98 in FIGS. 7 ad 9.

The top chamber plate 50 is secured to the lens mold carrier 74 by a plurality of magnets 58, thirteen of which are illustrated in FIG. 3. The magnets 58 are secured to the top chamber plate 50 by means of magnet holders 56, 56(a), 57, 57(a) and (57(b). These magnets are aligned with magnet steel buttons in the lens mold carrier as will be hereinafter explained in greater detail. While magnets have been used in the embodiment of the invention, it should be understood that a variety of quick release gripping means could be utilized such as polycarbonate or liquid crystalline polymer grips similar to the grip mechanism illustrated in the parent application U.S. Ser. No. 08/258,556 entitled Automated Method and Apparatus For Hydrating Soft Contact Lenses.

The lens mold carrier 74 is more fully described as illustrated with respect to FIGS. 7 and 8. As illustrated in FIG. 7, the lens mold carrier plate 74 includes 32 openings 76 which are used to receive individual lens molds and the contact lens molded therein. The bowl of the contact lens mold is received within a resilient silicone rubber cushion washer 78 which centers the bowl and provides a resilient cupping between the plate and the mold when the mold is contacted by the lens hydrating means 52 of the top chamber plate, as will be hereinafter described with respect to FIG. 9.

Figure 10:
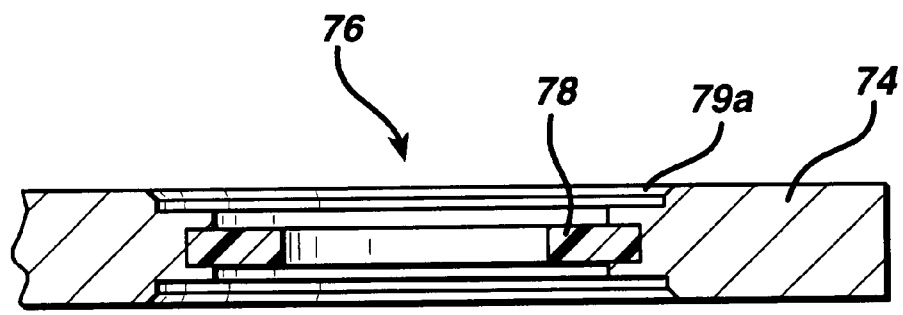
FIG. 10 is a cross-section detail taken along section line B—B of FIG. 8.

As illustrated in FIGS. 7 and 10, the cushioning washer 78 is centered within the lens mold carrier 74 and mounted within an annular 0 ring groove 82 formed in the center of opening 76. The operative faces of cushioning washer 78 are symmetrical on opposite sides of plate 74.

Figure 11:
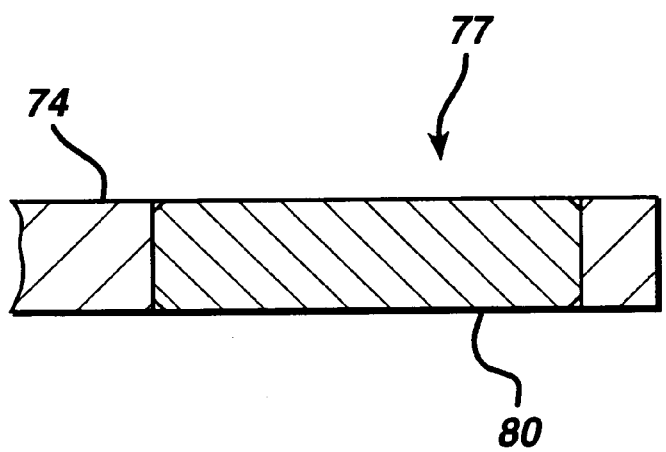
FIG. 11 is a cross-section detail taken along section line C—C of FIG. 8.

As illustrated in FIG. 11, a magnet steel 80 is secured within recesses 77 by press fitting the magnet steel into mold carrier plate 74. The magnet steel being is of 17-4 ph stainless steel which prevents oxidation or other reactions under normal process conditions. The magnet steel members 80 cooperate with the magnets 58 secured in the top chamber plate 50 to hold the two in a single assembly as illustrated in FIG. 9 as the hydration carrier. Registration pins 54 engage two of the registration openings 75 defined in the lens mold carrier plate 74.

One optional form of construction is to form the mold carrier plate 74 in two planar parts, and sandwich the cushioning washers 78 and the magnet steels therebetween at the time of assembly. During sliding transport, the mold carrier plate is suspended between two downwardly extending legs, at either end of the plate, one of which is illustrated 98 in FIG. 7.

Figure 5:
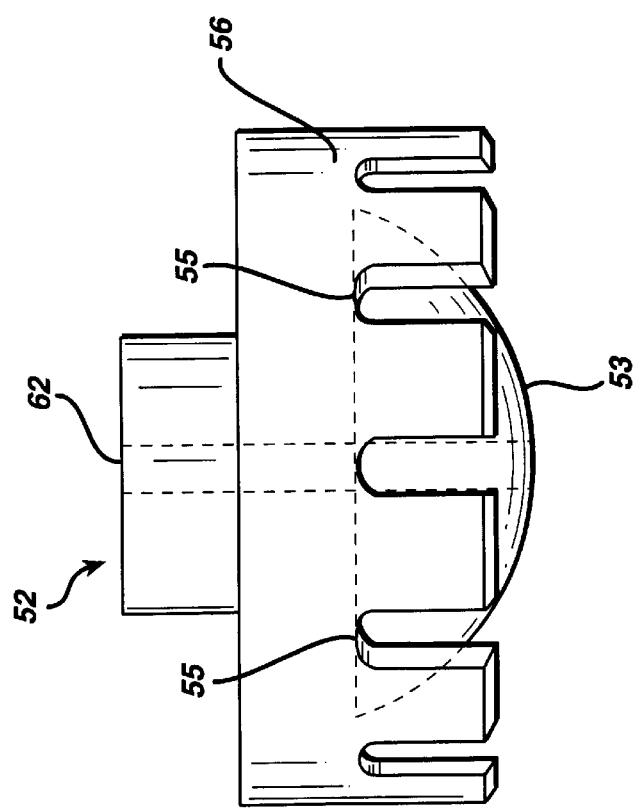
FIG. 5 is a side elevation view of a single lens hydrating element utilized in the present invention.

The convex lens hydrating elements used in the present invention are illustrated in FIGS. 5 and 6 in which the convex surface 53 is molded in the shape of a soft contact lens, and to restrain the lens against excessive curl during hydration. The element is preferably molded of polyetheretherkentone (PEEK) which provides the desired surface finish and surface energy levels with a long production life under the process conditions of the present invention. A central orifice 62 is provided to provide a fluid flow to hydrate the lens, which hydration unseats a contact lens adhered the concave surface 252 of the mold half 240. An annular wall 56 surrounds the convex surface 53 to prevent the loss of lenses that may not be correctly centered during transfer and to register the gap or vertical distance between the convex surface 53 and the lens mold cavity 252. A plurality of openings 55 are formed in the annular sidewall 56 to allow flushing fluids to escape when the contact lens is flushed with a continuous stream of de-ionized water, as for example, during flushing of the hydration chamber, when the convex surface is mated to the lens mold, as illustrated in FIG. 9.

During hydration, deionized water is introduced into the hydration chamber by hydration element 52 through orifice 62 to flush the hydration chamber, and the deionized water will remain in the mold half cavity 252 after flushing by virtue of fluid equilibrium which is established by rim 252(a) of the concave lens mold. This residual fluid is used for extraction between flush cycles.

The hydration assembly is illustrated in FIG. 9 wherein FIG. 9 is an enlarged cross-section illustration of a single hydration chamber formed between top chamber plate 50, mold carrier plate 74 a mold half 240. The front curve lens mold 240 is secured within the lens carrier plate 74 and is centered within the rubber cushioning washer 78 with the annular flange of the lens mold centered within annular recess 79a. When the top chamber plate 50, lens mold 240 and the lens mold carrier 74 are assembled, the contact lens 8 is still adhered to the lens mold 240. As the lens hydrates, it breaks free of the lens mold 240 and initially curls upon itself. The convex portion 53 gently engages the lens 8 and prevents excessive curl. As the hydration progresses, the lens 8 relaxes and will rest within the mold cavity 252 through the extraction process.

FIRST ASSEMBLY DEVICE

Figure 13:
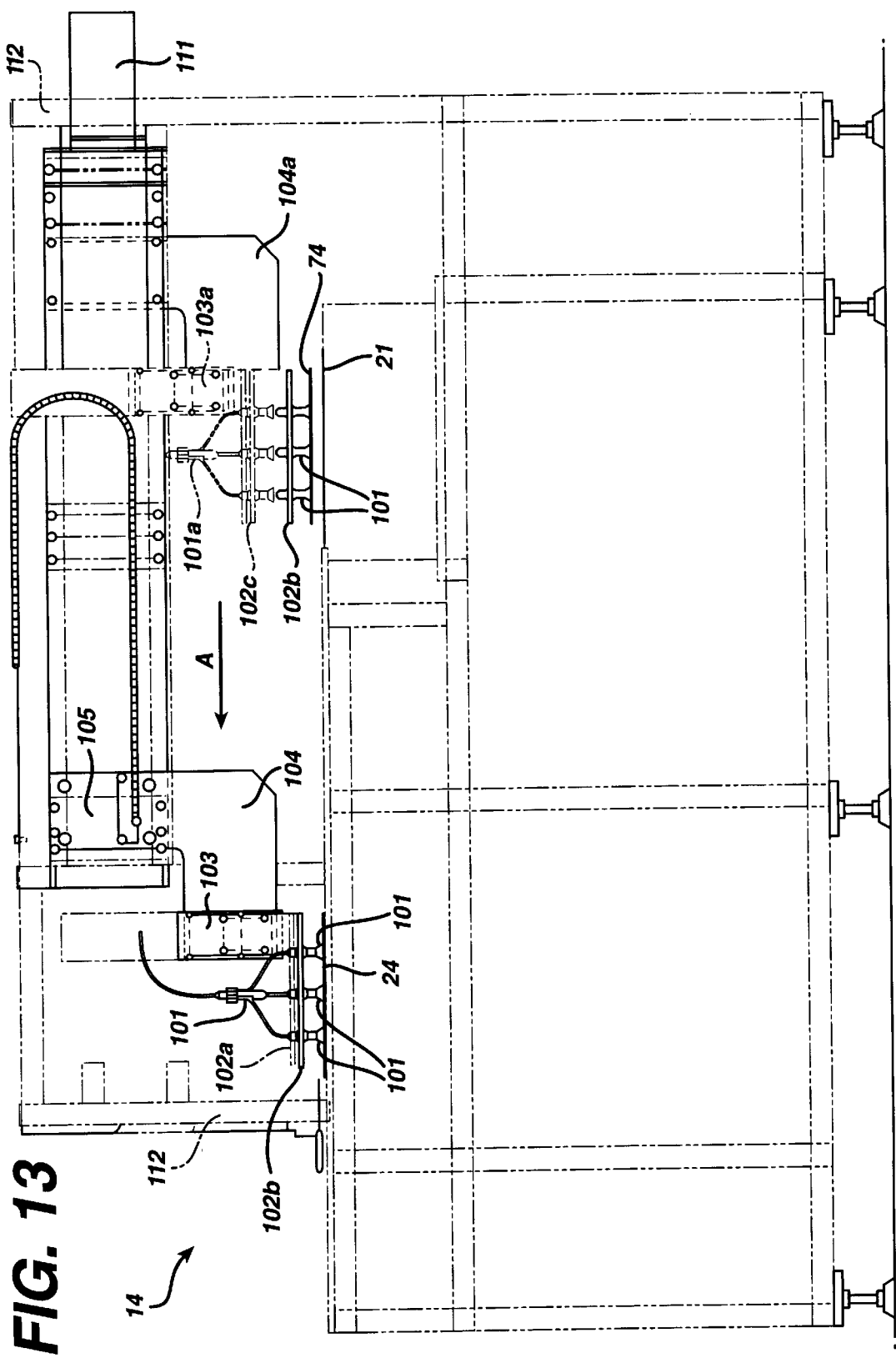
FIG. 13 is an elevation and diagrammatic end view of the first assembly device illustrated in FIGS. 1 and 2.
Figure 14:
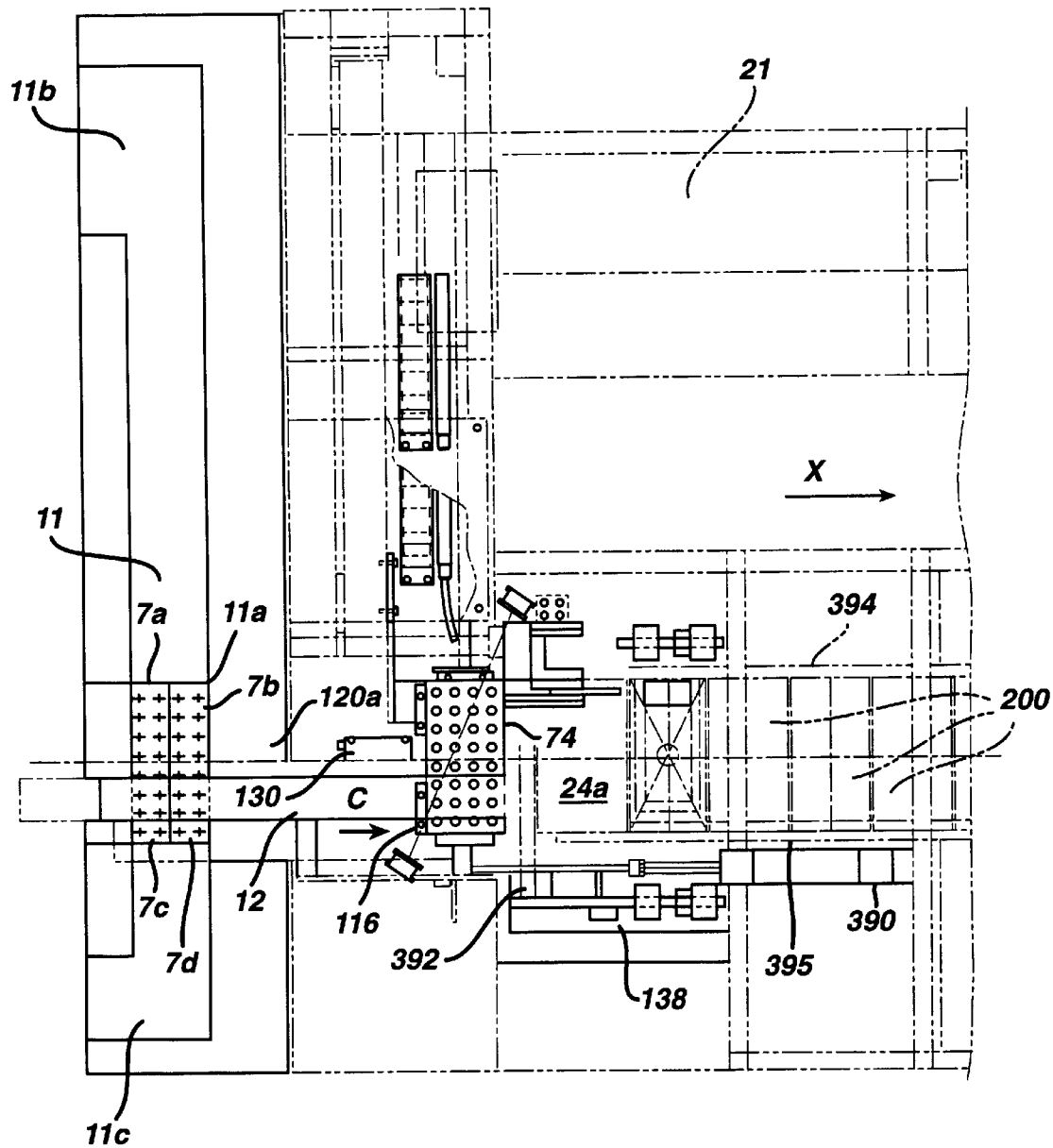
FIG. 14 is a top plan view of the first robotic assembly device, the first assembly area and the first hydration station.
Figure 15:
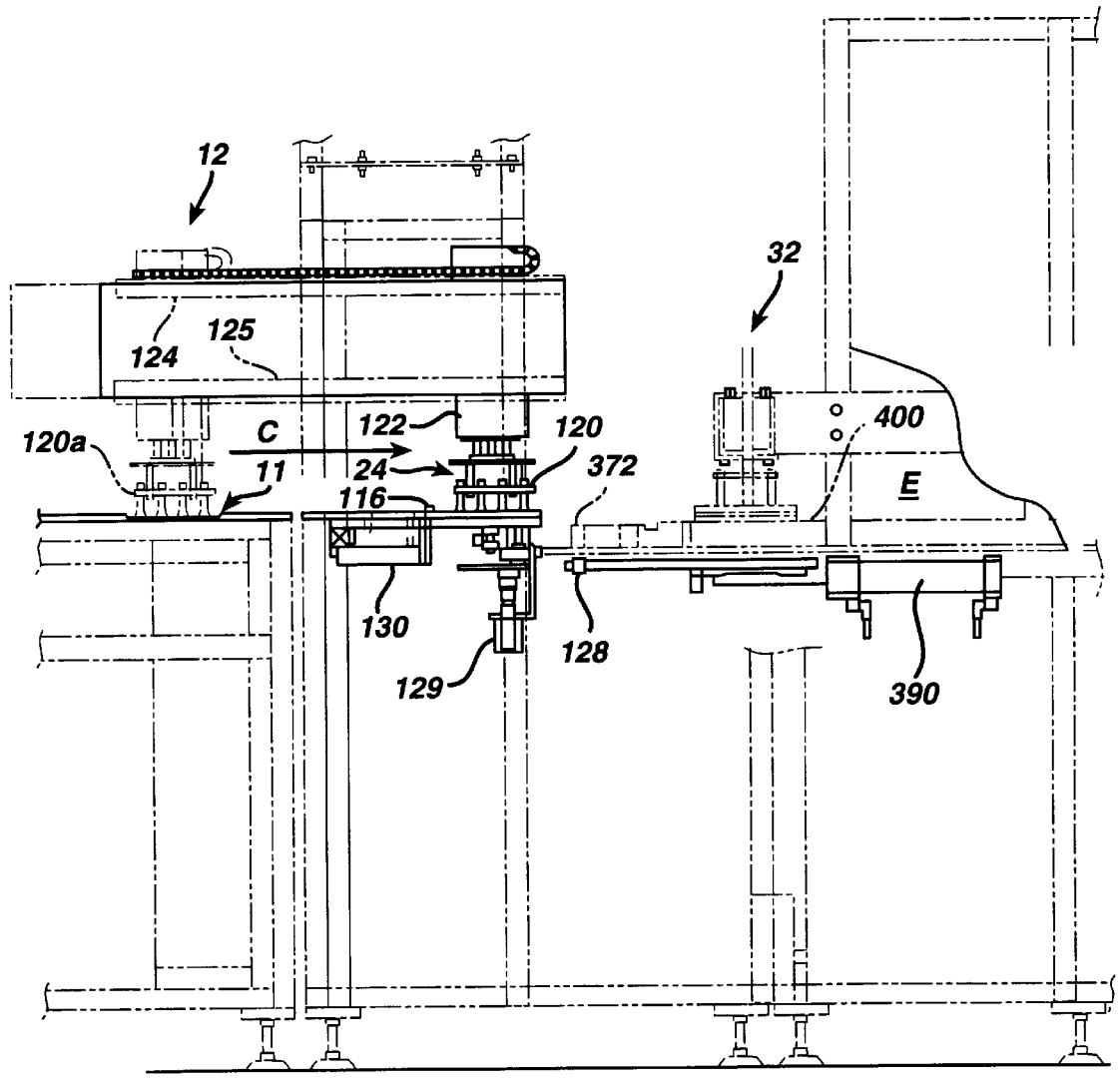
FIG. 15 is a side elevation view of a portion of the assembly apparatus illustrated in FIGS. 13 and 14.
Figure 17:
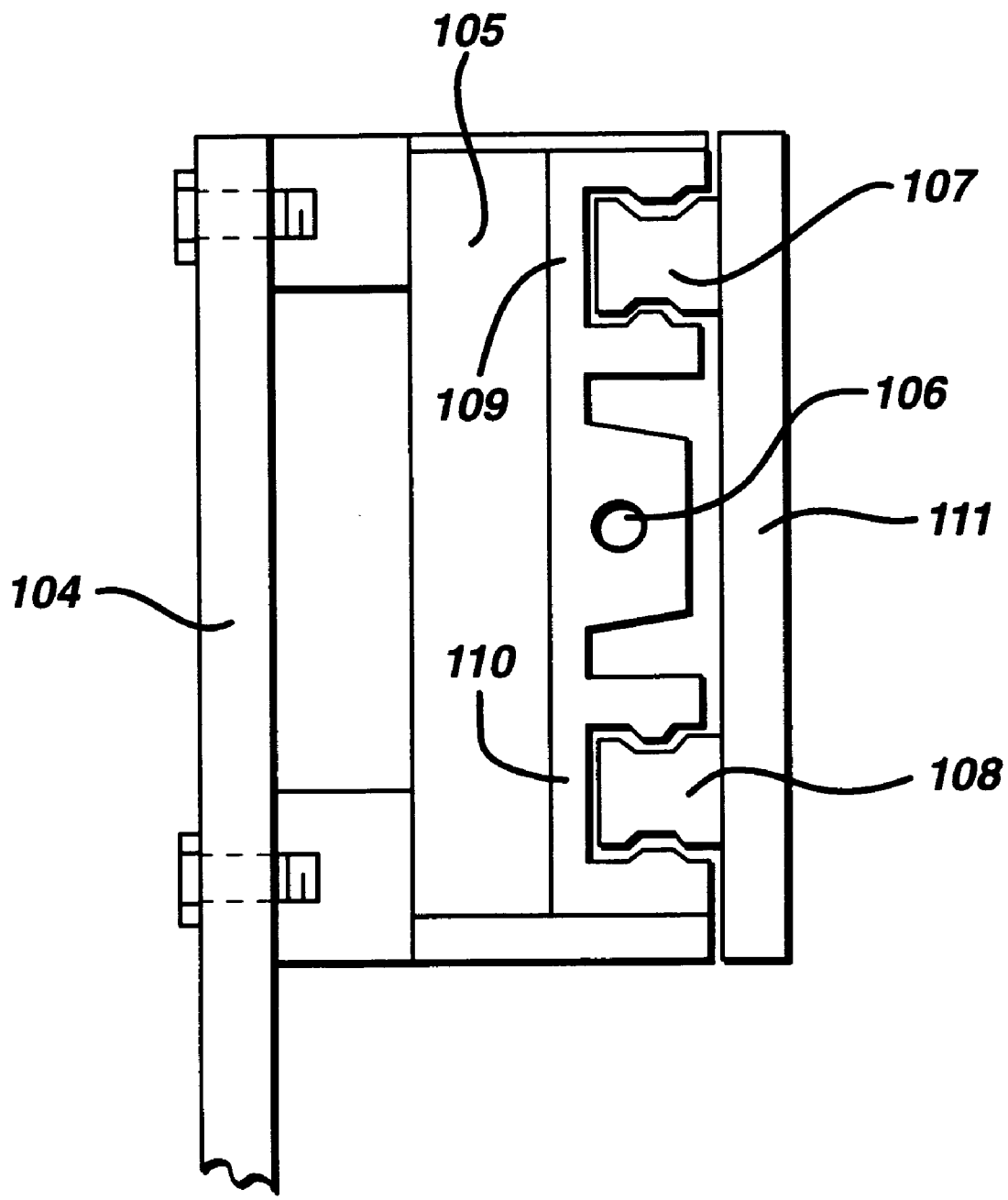
FIG. 17 is a cross-section detail of a typical transport arm for the robotic assemblies used in the present invention.

The first assembly device is contained within the dotted line box 14 of FIG. 1, and is illustrated in an elevation view in FIG. 15, a plan view of FIG. 14, and a side elevation view in FIG. 13. This device includes a reciprocating set of four vacuum grips 101 three of which are illustrated in FIG. 13, which reciprocate back and forth between the return conveyor 21 and the assembly area 24. The vacuum grip assembly is mounted for reciprocation in the Z axis on reciprocating frame 102 and for reciprocation in the Y axis (of FIG. 1) on carriage member 104 as illustrated in FIG. 13. Carriage member 104 reciprocates to the position 104a along a IKO ball screw drive which is illustrated in cross section in FIG. 17. Carriage member 104 is mounted to the ball screw drive 105 which is reciprocated along the Y axis by means of a rotating threaded rod 106. It is supported for reciprocation on linear guides 107, 108 by means of bearing members 109, 110. The linear guides 107, 108 are supported by plate member 111 which is fixably attached to the frame 112 of the hydration apparatus. Another IKO drive 103 is used to reciprocate the frame member 102 with respect to the carriage 104 and provides for multi level operation for the vacuum gripping assembly.

Referring to FIG. 13, in operation, a lens mold carrier plate 74 is returned to the assembly station by return conveyor 21 and lifted by the vacuum gripping assembly 101(a) to the position 102b illustrated in FIG. 13. The carriage 104 is the reciprocated in the Z axis of FIG. 1 while in the position illustrated at 104a. After vertical clearance is achieved the carriage 104 is reciprocated in the Y axis to the position illustrated at 104, whereupon the frame member 102 reciprocates from the position 102a to the position 102b for release of the lens mold carrier plate at the assembly area 24.

Figure 16:
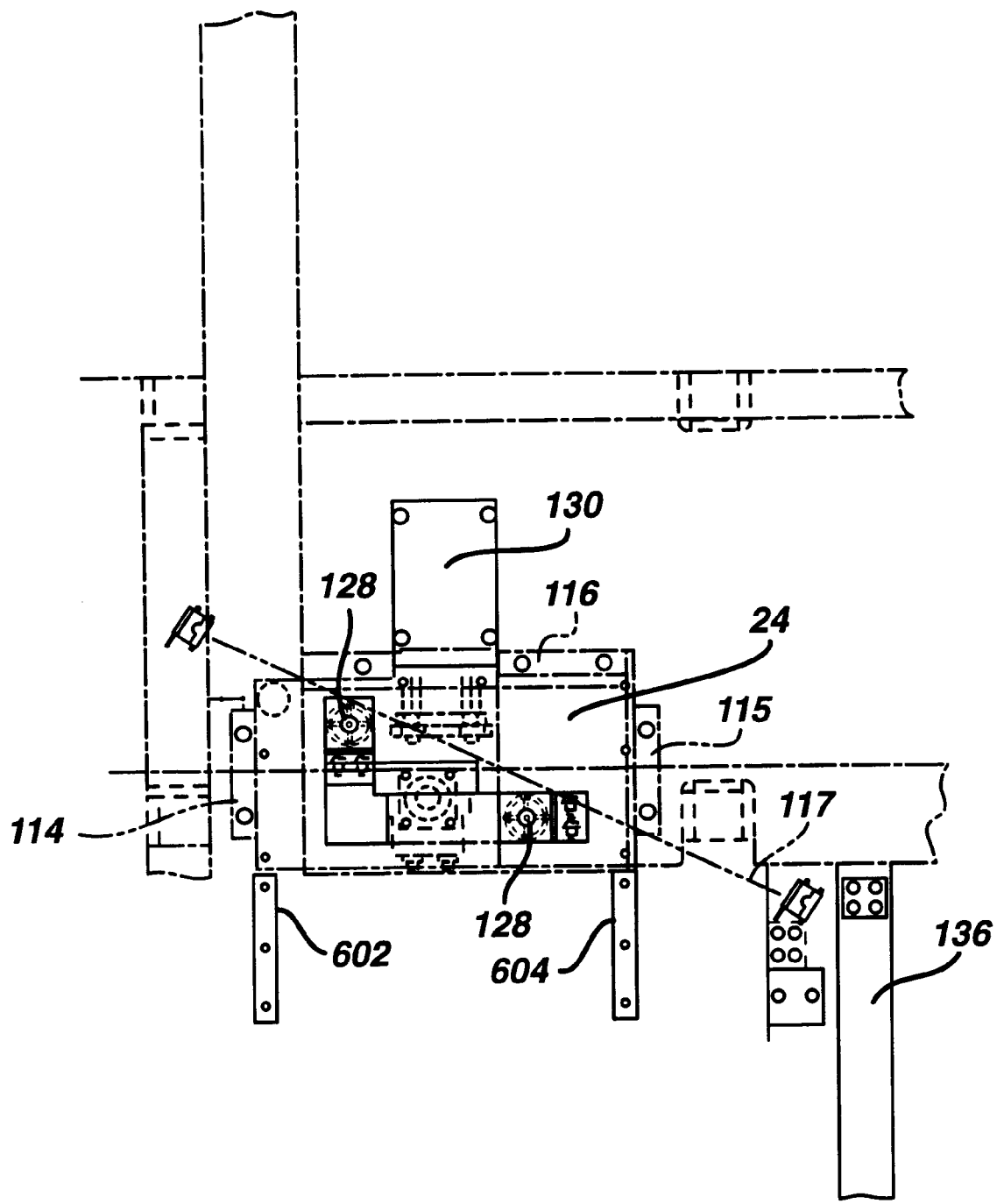
FIG. 16 is a detailed top plan view of the assembly station used to assemble the hydration carrier.

As illustrated in FIG. 16, the lens mold carrier plate 74 is deposited in the assembly area 24 in registration with a pair of reciprocal pins 128 which are used to align and register the carrier plate for subsequent assembly operations. Registration is further facilitated by means of fixed guides 114, 115 and a moveable guide 116, the operation of which will be hereinafter further described with respect to FIG. 14 and 15. An infra red beam is transmitted along optical path 117 as shown in FIG. 16 to shut down the operation of the station if a plate or carrier is misaligned or improperly seated.

Referring to FIG. 13, the vacuum grips 101 and the frame member 102 are raised to the position illustrated at 102a, and reciprocated back to the return conveyor 21. As they are reciprocated back, the vacuum grips are further raised in the Z axis to the position illustrated at 101a and 102c. Two levels of reciprocation are necessary inasmuch as the two elements of the hydration carrier, the mold carrier plate 74 and the top chamber plate 50 are of different height. After the mold carrier plate 74 has been placed at position 24, and before the top chamber plate 50 is aligned therewith, the first robotic assembly delivers a plurality of contact lens molds from the production line 11 to the lens mold carrier plate 74.

FIRST ROBOTIC ASSEMBLY

The first robotic assembly is more fully illustrated in FIGS. 14 and 15 wherein FIG. 14 is a plan view of the area delineated by dotted line box 12 of FIG. 1, and FIG. 15 is an elevation view thereof. As illustrated in FIG. 14, in the preferred embodiment of the invention, 32 contact lens molds are transferred in a single step from the production line conveyor 11 to the first assembly area 24. These contact lens molds are carried in four production line pallets 7a, 7b, 7c and 7d and are held on the production conveyor 11 by means of a moveable stop 11a. A vacuum gripping assembly illustrated in FIG. 15 as 120 moves from the position 120a over the production line conveyor 11 to the position 120 along the direction of arrow c in FIG. 15. The vacuum head assembly 120 includes 32 individual vacuum gripping cups which grip the front curve lens mold 240 around the annular flange thereof for transport between the production line conveyor and the first assembly area 24.

The vacuum head assembly 120 illustrated in FIG. 15 reciprocates along the Z axis by virtue of pneumatic cylinder in carriage 122. Likewise, the carriage 122 reciprocates in the X axis by virtue of an IKO ball screw mechanism previously described with respect to FIG. 17 wherein the fixed or stationary support member is fixably attached to frame members 124, 125 which span the distance between the production line conveyor 11 and the assembly staging area 24. Pressure monitoring sensors are provided for the vacuum source for each of these suction heads carried by vacuum assembly 120. In the event of a missing or misregistered lens mold, a defect signal is passed to a programmable logic controller which controls the operation of the hydration apparatus 10, and the synchronization of the various robotic elements within the apparatus. While four vacuum grippers are illustrated in the end view of FIG. 15, it is understood that 32 grippers are provided in the matrix array illustrated in FIG. 14 for the pallets 7a–7d and the lens mold carrier plate 74.

The lens mold carrier plate 74, illustrated in FIG. 14, is registered in position by virtue of tapered registration pins 128 illustrated in FIG. 16, which are reciprocated upwardly for initial engagement of the lens mold carrier by a pneumatic cylinder 129 as illustrated in FIG. 15. The registration pins engage two of the registration openings 75 illustrated in FIG. 8. In the preferred embodiment of the invention two reciprocating pins 128 are provided to securely position the lens mold carrier 74 against movement in both the X and Y axis. One or more magnets may be provided to cooperate with the magnet steel buttons 80 to hold the lens mold carrier plate in the Z axis. This prevents the plate from jumping in the Z axis when the top chamber plate (having magnets therein) is lowered into position.

After the lens mold carrier 74 has been secured and registered, as illustrated in FIG. 14, the contact lens molds are transferred by the vacuum assembly 120 from the position illustrated at 120a in FIG. 15 to the position illustrated at 120. Each of the lens molds, and contact lenses, are then deposited in the lens mold carrier 74 as was previously described with respect to FIG. 9. While the first robotic assembly is reciprocating in the direction of arrow C, the moveable stop 11a is lowered, and the pallets 7a–7d are then conveyed along the production line conveyor 11 to the pallet return conveyor 11b and a new set of pallets is assembled from the incoming production line conveyor at 11c. Stop 11a is again raised, and a new matrix is assembled as illustrated in FIG. 14.

After the lens molds have been deposited in the lens mold carrier plate 74, the first robotic assembly reciprocates in the direction opposite the arrow C to pick up the new lens molds, while the first assembly device, illustrated in FIG. 13, picks up a top chamber plate from the return conveyor 21, and carries it along the Y axis to the assembly position 24 as illustrated in FIGS. 11 and 13. The top chamber plate 50 is then lowered in the Z axis to be deposited on the lens mold carrier 74 and on the contact lens molds therein to form the hydration assembly illustrated in FIG. 9. The first assembly device then retracts the vacuum gripper assembly 101, first in the Z axis, and then in the direction opposite the arrow A to pick up a new lens mold carrier and to initiate another start cycle for the hydration apparatus.

Figure 12:
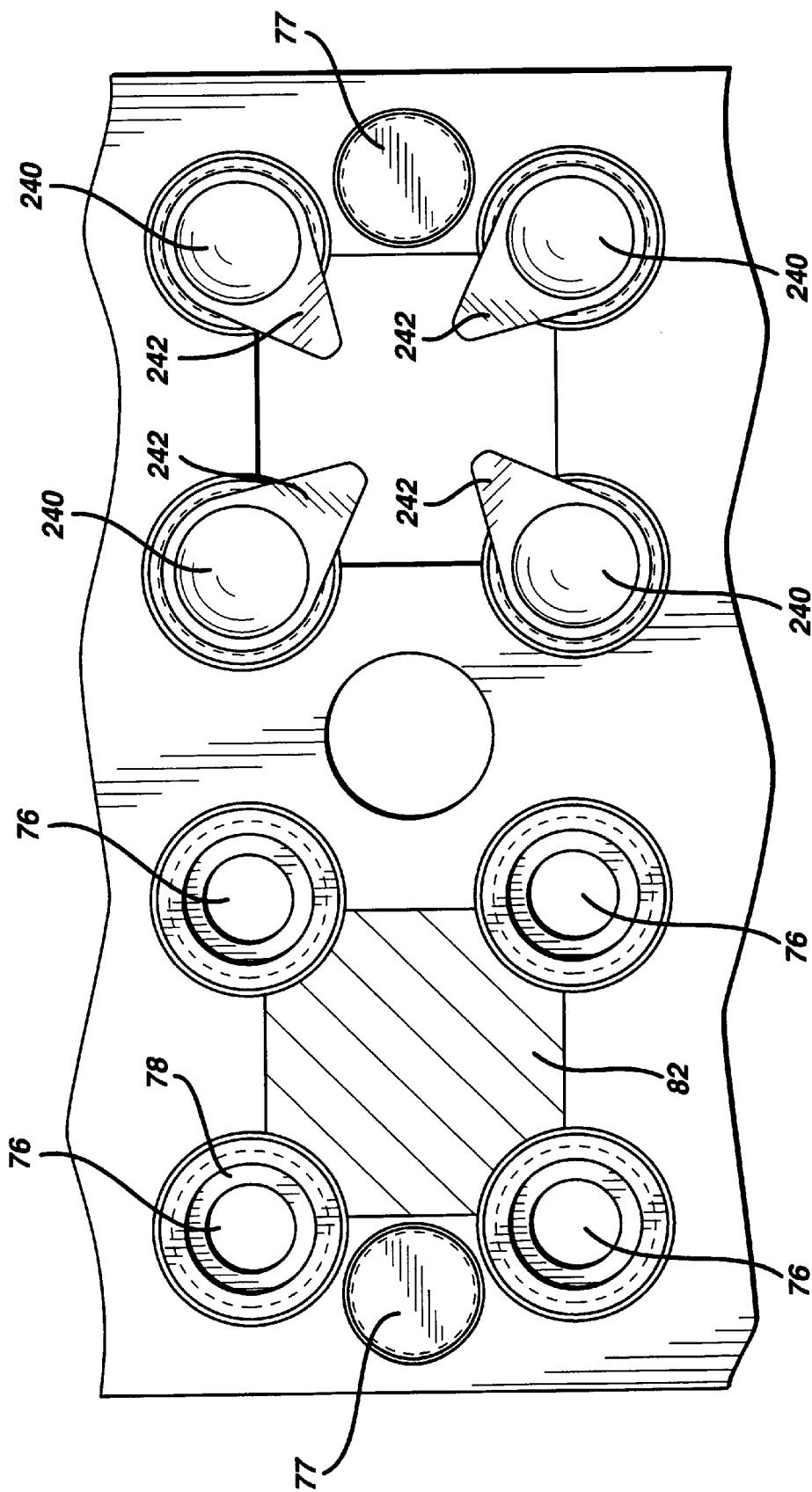
FIG. 12 is a partially shaded illustrative plan view of the mold carrier of the present invention, illustrating 4 lens molds in one portion thereof.

As illustrated in FIG. 12, an open area 82 may be provided in the mold carrier plate 74 between each set of openings 76 which receive the contact lens molds 240 to provide vertical clearance for the outwardly extending flange portion 242 of the contact lens molds 240 and to provide for drainage of the deionized water supplied to each of the hydration chambers. This open area 82 may also be a recessed area commensurate in depth with the recess 79a which surrounds each of the openings 76 to receive the annular portion of the mold 240 with openings defined therein to permit drainage of the deionized water as it exits the individual hydration chambers. After assembly of the hydration carrier is completed, the registration pins 128 are withdrawn from the lens mold carrier by pneumatic cylinder 129. Pneumatic cylinder 130 then reciprocates moveable alignment guide 116 in the X axis, as illustrated by arrow c in FIG. 15 in order to slide the first hydration carrier along the rails 602, 604 (illustrated in FIG. 16) to an intermediate staging position, illustrated as 24a in FIG. 14. From this intermediate position 24a, the hydration carrier is advanced through the hydration and extraction stations 32 by short stroke conveyor 390 which advances a string of hydration carriers in an abutting relationship through the hydration and extraction stations as will hereinafter be explained in greater detail.

HYDRATION

During hydration, the carrier 200 provides for full and complete immersion of the lenses 8 in a deionized water solution, wherein the solution contains a small amount of surfactant, typically on the order to 0.001% to 5% by volume. Suitable surfactants include the family of polymeric surfactants, in this instance, preferably a polyethylene oxide sorbitan mono-oleate, commercially sold under the tradename "Tween 80".

This solution differs substantially from the hydration solution used in the prior art processes typified in U.S. Pat. No. 4,495,313 to Larsen inasmuch as the time consuming ionic neutralization of the polymer from which the lens blank may be made does not have to occur during the hydration process. When deionized water is used in the hydration process, a buffered saline solution is added to the final packaging of the lens so that the final lens equilibrium (ionic neutralization, final hydration and final lens dimensioning) is accomplished in the package at room temperature or during the sterilization process. That neutralization creates temporary destabilization of the dimension of the lens, and requires an extended period of time to complete, which results in an undesirable large batch operation when placed in an automated production line having a serial molding input, inspection and serial package output.

The transit time through hydration is to some extent dependent upon the temperature of the hydration bath. For a deionized water hydration bath with a 0.01 to 0.05% surfactant, and preferably 0.02%, the desired residence time for a HEMA soft contact lens varies from 3 to 20 minutes at temperatures of 60° C. to 90° C. During the initial portion of hydration and extraction, the deionized water provided to the lens may be continuously changed or flushed to continuously lower the concentration of the leachables at the lens surface. A five minute continuous flow time has been found advantageous when the hydration bath temperature is maintained at 75 to 90° C. plus or minus 5 degrees, and preferably at 85° C. It is noted that during the continuous flow period, the contact lens 8 hydrates and swells, thereby breaking free of the front curve mold half 290.

The cycle time of the apparatus may be varied, but is dependent to some extent on the cycle rate of the production line as a whole. Hydration at the aforesaid temperature may last from 3 to 20 minutes, and preferably 10 to 15 minutes and it is therefore desirable to have sufficient hydration carriers in the extraction line to accept the entire output of the line for the hydration period selected, as divided by the cycle rate of the production line as a whole.

The flow rate through each of the hydration chambers should be rapid enough to break down the boundary layer of deionized water immediately adjacent the contact lens to facilitate the maximum rate of exchange in the diffusion/mass transfer dynamics. The flow rate is also dependent on bowl volume, for it has been found that if the flow rate is too rapid, the deionized water at the lens surface is too turbulent for good mass exchange, and if the flow is too slow, the boundary layer is not broken. In the preferred embodiment, with a 0.3 ml bowl, it has been found that a flow rate of 0.3 ml/min. to 250 ml/min. may be used, with a preferred rate of 125 ml/min.

After assembly, the hydration carrier, is transported by an indexing conveyor. The indexing conveyor includes a pneumatic cylinder 390 which drives a linear push plate 392 in the X axis direction of FIGS. 1 and 14. The push plate 392 advances the hydration carrier for an index distance equal to the width of the carrier and then returns to the position illustrated in FIG. 14. The path of the index conveyor is defined by guides 394 and 395 which define a path width equal to the length of the hydration carrier 200, and which support the hydration member 200 for transport above an open collection sump 4. Three assembled second hydration carriers 200 are illustrated in FIG. 14 proceeding from the first extraction station 32. As the pneumatic cylinder is actuated, the push plate 392 advances or indexes the entire string of hydration carriers 200 along the conveyor path defined by guides 394 and 395.

Figure 25:
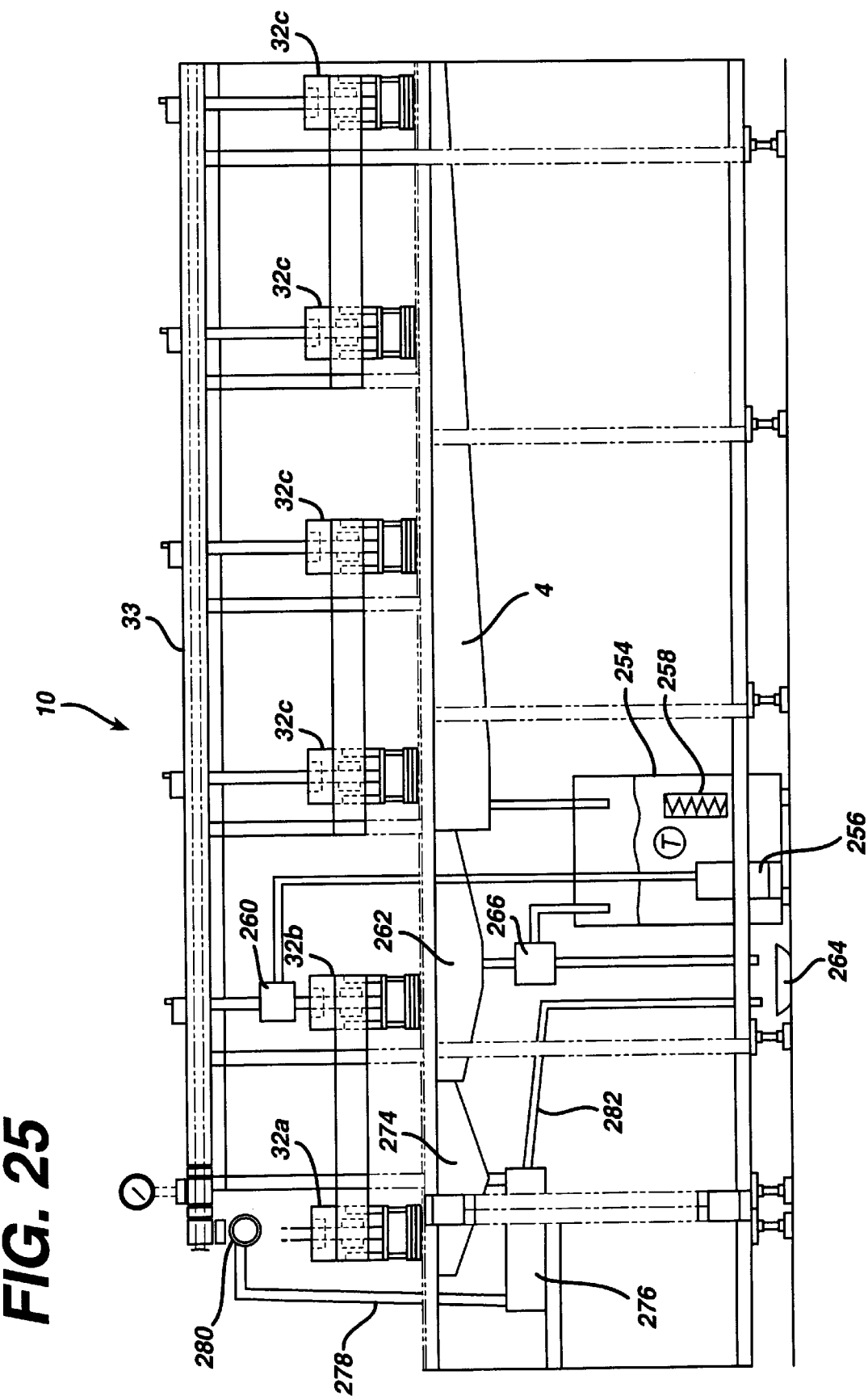
FIG. 25 is an elevation view of the hydration and extraction stations of the present invention, illustrating diagrammatically, the recirculating flow mechanisms used in the present invention.

As illustrated in FIGS. 2 and 25, there are six hydration and extraction stations 32 sequentially located along the path of the extraction or index conveyor. Each of the hydration carriers 200 are indexed in step wise manner down the extraction conveyor path by the pneumatic cylinder 390. Each of the six extraction stations 32 receive the hydration carriers and periodically flush and exchange the deionized water therein to continue to leach the by-products of hydration from the contact lenses while carried there within.

While prior art saline hydration baths required 120–180 minutes to achieve satisfactory results, it has been found that a three to twenty minute cycle of cycled flushes (depending on temperature) and leaching will produce a lens with no detectable contaminants therein. In the preferred embodiment. The first two stations provide continuous flushing flow, while the remaining 4 stations provide intermittent flow with a flush cycle of approximately 18 seconds, with 1–2 seconds of actual flushing in each cycle). The extraction stations are spaced from one another a distance corresponding to the width of three of the hydration members 200. Thus, step wise indexing of the hydration base members results in a 2–4 second flush (in a 30 second flush period) and a 120 second leach cycle to provide maximum exchange of leachable materials from the lens. This cycle is repeated four to six times for a total of slightly more than twelve minutes, the total time for travel through the apparatus of the present invention.

EXTRACTION STATIONS

Figure 23:
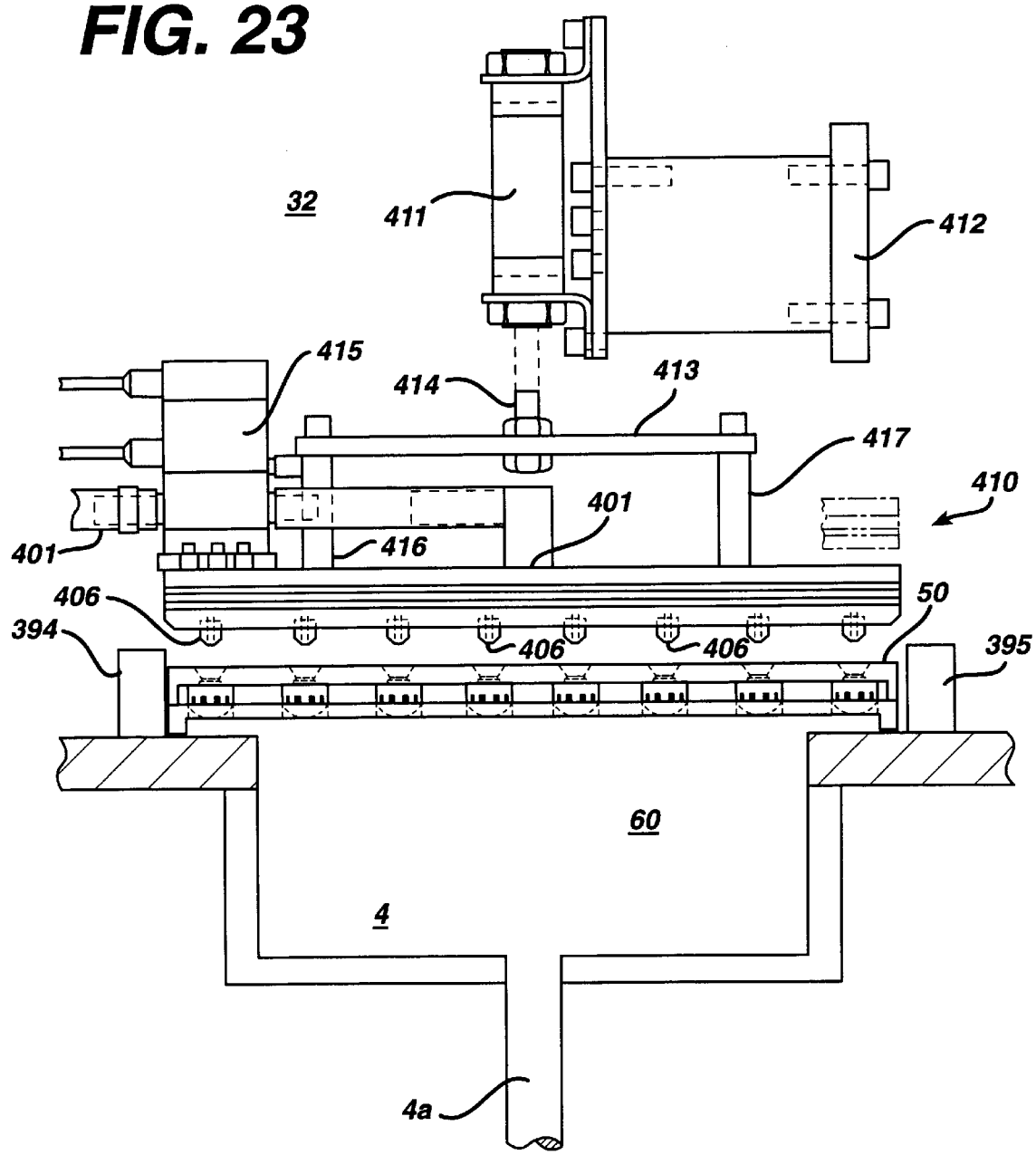
FIG. 23 is a diagrammatic elevation view of a hydration or extraction station of the present invention.
Figure 24:
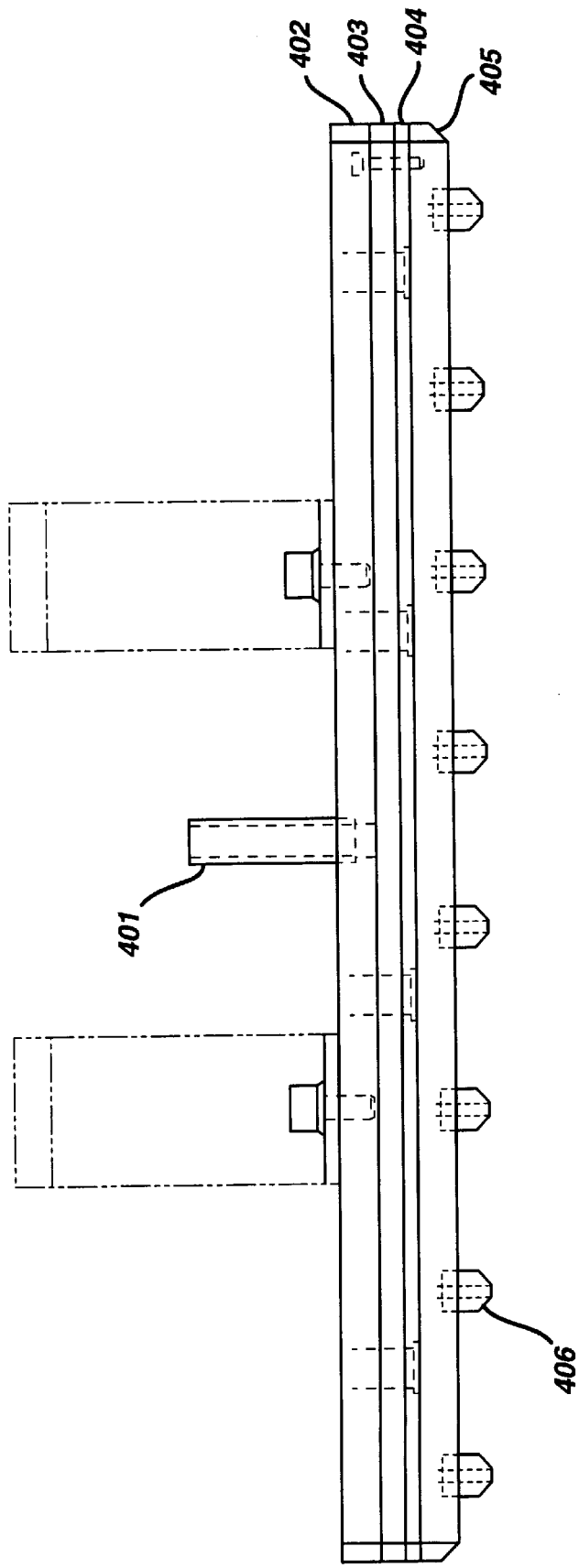
FIG. 24 is detailed and partially cross-sectioned view of the flushing head of the extraction apparatus illustrated in FIG. 23.

A representative extraction station is illustrated in FIGS. 23–25 in which the combined top chamber plate 50 and mold carrier base member 74 form the hydration carrier 200. A flush manifold 410 illustrated in FIGS. 23 and 24 includes a deionized water supply conduit 401 manifold members 402, 403, 404 and 405 and a plurality of engagable nozzles 406. The engagable nozzles include an array of 32 direct engagement nozzles 406. Thus, when the flushing manifold 410 is lowered into engagement with a hydration base member, the lens is flushed from above, either continuously, or for a period of 1–2 seconds duration which removes existing residual deionized water from the previous extraction cycle, and provides a fresh leach solution for the hydration solution in the bowl 252 of the mold half 240. As the chamber is flushed, the deionized water flows through the radial openings 55 in the annular wall 56 of the hydration element 52 then conveyed to the side of the hydration base member to drain into the collection sump 4 therebelow. The extraction manifold 410 is vertically reciprocated by means of a pneumatic motor 411 which is fixably attached to a stationary frame 412. A carrier plate 413 is fixably attached to the drive piston of pneumatic cylinder 411 and reciprocates vertically in the Z axis in response to the PLC control instructions from control means 5. A valve member 415 is also provided to regulate the flow of deionized water through the extraction manifold. Extraction manifold 410 is secured to the support plate 413 by bracket members 416, 417.

FIG. 25 illustrates in elevation and diagrammatic form one embodiment of the invention in which two of the extraction stations provide continuous flow of hydration fluid for the lens 8, while the remaining four stations provide intermittent or cyclic flow. As illustrated, hydration/extraction stations 32a are each equipped with recirculating systems that provide a continuous flow of deionized water to the hydration chamber formed between the mold cavity 252 and the convex hydrating element 53. As discussed previously, deionized water is supplied to manifold 33 and is provided for a short flush cycle of two to four seconds by each of the hydrating stations indicated at 32c in FIG. 25. Manifold 33 is preferably a recirculating manifold that forms a closed loop with the heated tank 45 illustrated in FIG. 2 to maintain the temperature of the deionized water in the manifold at a constant desired temperature. As the deionized water in the mold cavity is exchanged, it flows outwardly across the top of the mold carrier plate 74 and through the openings 75, 85 into collection sump 4 which drains into a deionized water collection tank 254. The deionized water in tank 254 is maintained at a predetermined temperature between 60° C. and 90° C. by means of a thermostatically controlled heater element 258. This deionized water is then pumped via sump pump 256 to a proportioning valve 260 which may selectively allocate the percentage of recirculated water from tank 254 and fresh deionized water from manifold 33 provided to extraction station 32b. The waste water from extraction station 32a, is collected from in sump basin 262 and may either be returned to the collection tank 254, or discharged to a floor drain 264 by means of a second proportioning valve 266. Proportioning valves 260 and 266 may be manually set or automatically controlled by a PLC to provide a desired rate of replenishment for the recirculating flow. It has been found that in the initial stages of the hydration processes, it is not necessary to provide a continuous flow of pure deionized water to the lens surface. As long as a gradient is maintained at the lens surface between the concentration of the diluent by-products in the lens and the concentration in the hydration fluid, the mass exchange proceeds as desired. Likewise, the first hydration station 32a is provided with a recirculating system in the form of collection sump 274 recirculating pump 276 recirculating line 278 and a proportional control valve 280. A predetermined percentage of the recirculating fluid may be replenished through supply manifold 33, with the excess fluid discharged through drain line 282 to floor drain 264. The use of the recirculating systems for the hydration/extraction stations 32b thereby enables continuous flow of deionized water at the lens surface while minimizing deionized water consumption.

Each of the remaining extraction stations 32c receives a new hydration carrier with each cycle of operation, and provides a short 2 to 4 second flush cycle to exchange the deionized water in the bowls 252 of the individual molds. Each hydration carrier engages a hydration/extraction station every fourth cycle to exchange the deionized water therein. As indicated previously, the deionized water flushed from the individual molds by the hydration/extraction stations 32c is collected in sump 4 for subsequent recirculation of station 32b. The illustrated number of stations and the flush-dwell cycles described herein are to some extent determined by the output of the production line.

Proper extraction is both time and temperature dependent, with the preferred temperature being within the 60–95° C. temperature range. Thus the number of stations and the flush cycles may be varied, with temperature to achieve optimal extraction of the diluent by products.

THE SEPARATION STATION

Figure 26:
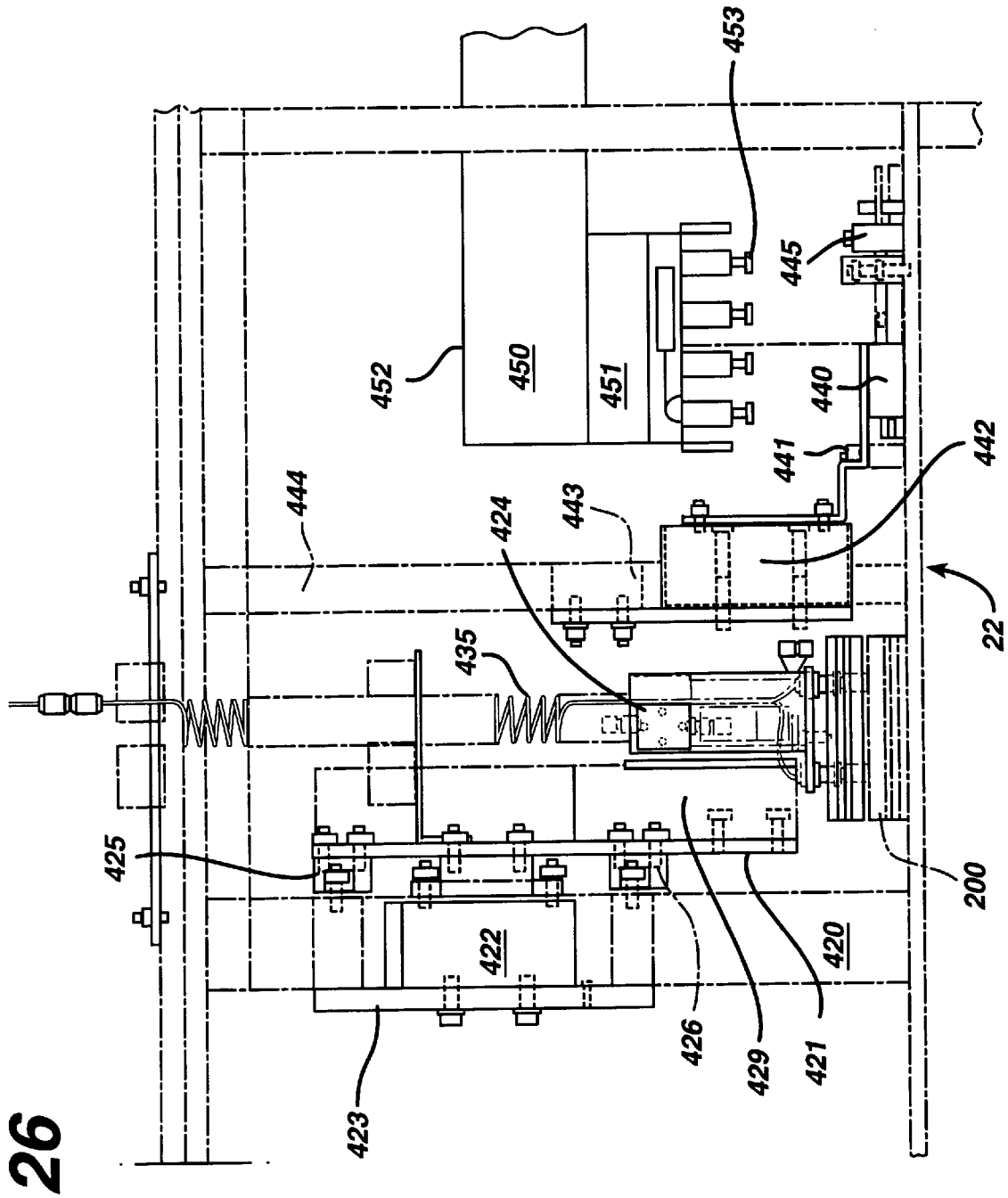
FIG. 26 is a side elevation view of the separation station utilized in the present invention.
Figure 27:
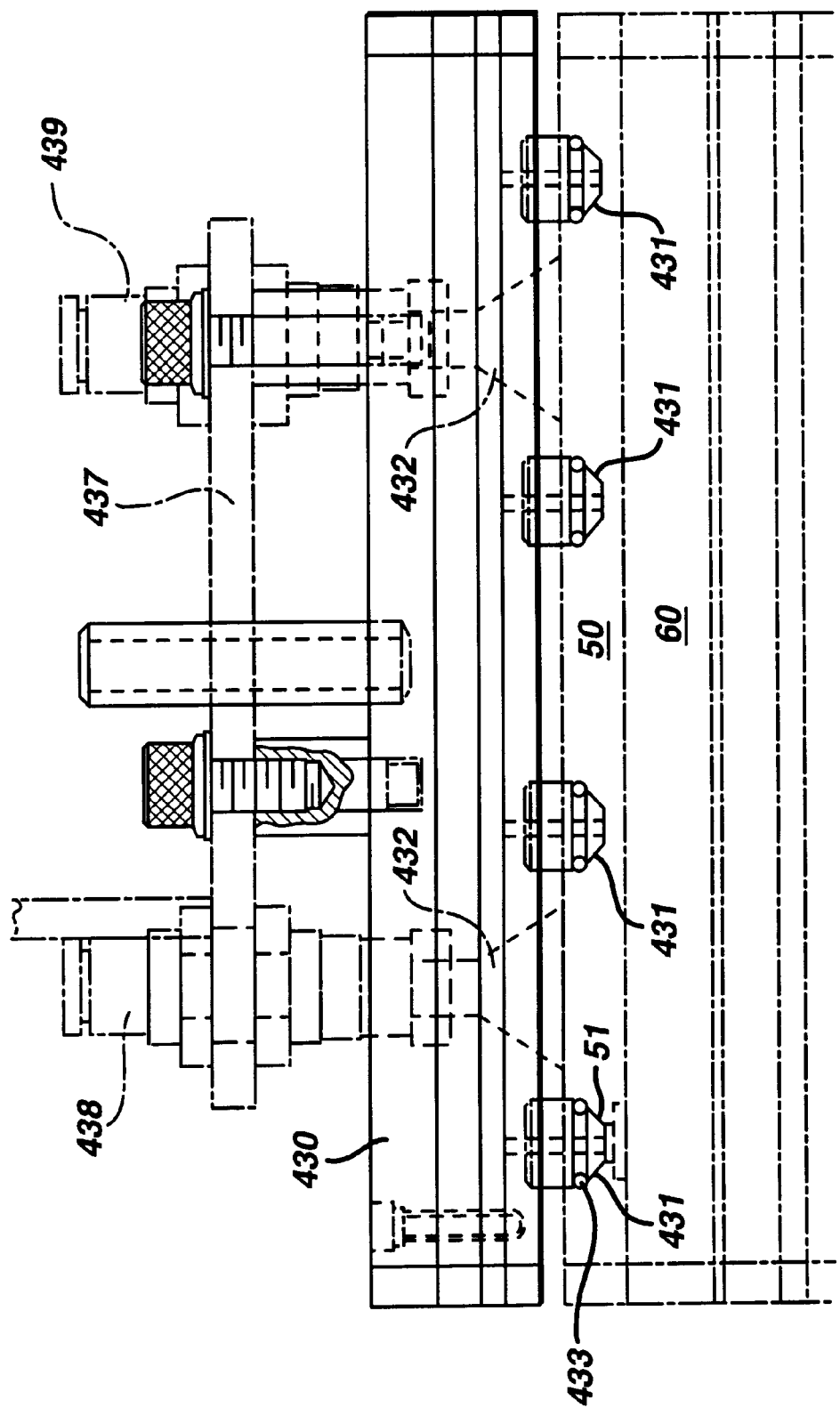
FIG. 27 is a partially cross-sectioned elevation end view of a portion of the dis-assembly device utilized in the present invention.
Figure 28:
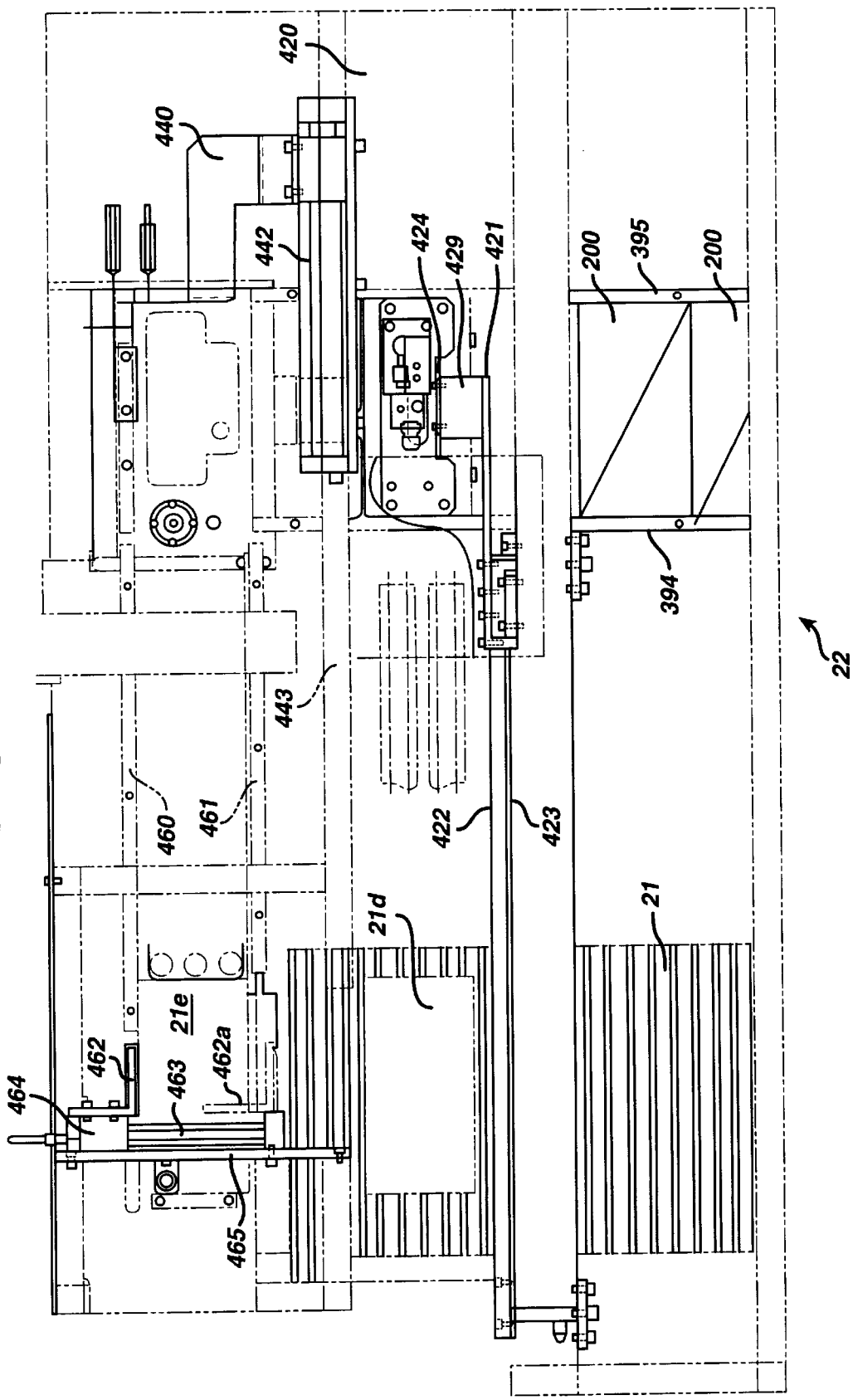
FIG. 28 is a partially cross-sectioned top plan view of the separation station used to dis-assemble the hydration carrier.
Figure 29:
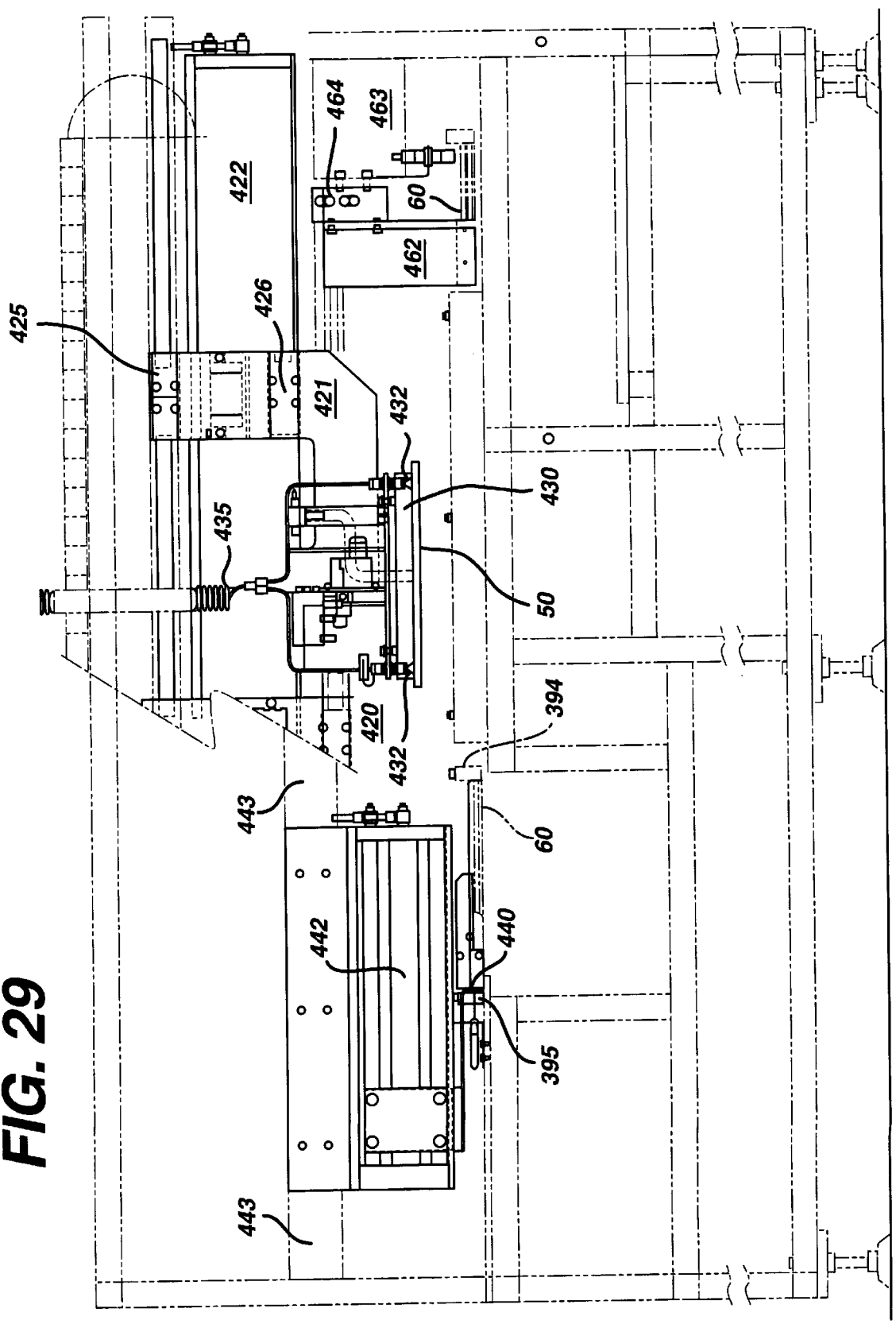
FIG. 29 is a partially cross-sectioned elevation end view of the separation station illustrated in FIGS. 26 and 28.

The separation station of the present invention which provides for separation of the top chamber plate 50 from the mold carrier plate 74, and the transfer of molds and contact lenses from the mold carrier plate to a lens transfer means is more fully illustrated and described with respect to FIGS. 26–29 in which FIG. 26 is an elevation end view of the separation apparatus. FIG. 27 is a partially cross-section view of the final extraction and separation apparatus, FIG. 28 is a top plan view and FIG. 29 is an end view of the entire hydration apparatus 10.

The apparatus illustrated in FIGS. 26, 27, 28 and 29 is found within the dotted line box 22 of FIG. 1. The disassembly apparatus 420 is illustrated in FIG. 26 in engaging contact with a hydration carrier 200. The dis-assembly device includes a vertically reciprocal carrier 421 which is fixed to an pneumatic cylinder 422 for translation in the Y axis (as illustrated in FIG. 1) from the extraction conveyor line to the return conveyor 21. The pneumatic cylinder drive is fixably supported by plate 423 which is secured by the hydration frame. The vertical reciprocation in the Z axis is accomplished with an IKO Ball Screw drive 429, which reciprocates carriage 424 along the Z axis. The horizontal translation of the dis-assembly apparatus is supported by frame member 423 and drive rollers 425, 426. The vertically reciprocal carriage 424 reciprocates with respect to the horizontal transverse carriage 421 by means of an IKO drive contained within housing 429.

As illustrated in FIG. 27, the dis-assembly device includes a transport head 430 which is equipped with an array of fluid nozzles 431 and vacuum grips 432 which are used to secure the top chamber plate 50 to the vacuum carriage 430 for transport to the return conveyor 21. Each of the individual nozzles 431 are equipped with an O ring seal which seats against the outwardly sloping opening 51 defined in the top chamber plate 50. The dis-assembly apparatus 420 is supplied with vacuum for the vacuum grip means 432 and with deionized water for the nozzles 431. Both are supplied through flexible conduits 435 which travel with the dis-assembly apparatus. In the preferred embodiment four vacuum gripping means 432 are used with two at either end of the top chamber plate. A mounting bracket means 437 secures the water manifold 430 to the dis-assembly device 420 and provide couplings 438, 439 for the vacuum lines which feed vacuum grips 432. During disassembly of the hydration carrier, deionized water may be supplied through the orifice 62 in each of the convex lens transfer devices mounted in the top chamber plate 50. The deionized water is supplied while vacuum pick up is applied to grip means 432. The separation of the two occurs during water dose which ensures that the contact lenses remain in the concave front curve mold part.

Also illustrated in FIG. 26, in side view, is a push plate for 440 which is used to return the hydration base members to the return conveyor 21 after the lenses had been removed by a lens transfer means. Push plate 440 is connected to carriage member 442 by arm 441 which is reciprocated along the Y axis of FIG. 1 by means of a drive cylinder 443 secured to frame member 444.

Sensors 445 are used in the transfer of molds and lenses from mold carrier plate 74 to the transfer means 450. Transfer means 450 includes a carriage member 451 which is mounted for both vertical and horizontal reciprocation with respect to horizontal member 452. The lens transfer device includes a 4×8 array of 32 downwardly descending fingers, each of which terminates in a vacuum gripping cup which engages the flange of the mold carrier 240. The lens transfer apparatus is similar to that previously described with respect to the first robotic assembly illustrated in FIGS. 14 and 15.

As illustrated in FIG. 28, the dis-assembly apparatus 420 moves the top chamber plate 50 from the position illustrated in FIG. 28 to the position illustrated at 21d on return conveyor 21 as the apparatus 420 traverses the pneumatic cylinder drive 422. When the dis-assembly apparatus 420 has reached the position over 21d, it again reciprocates in the Z axis to lower the top chamber plate to the return conveyor 21 before vacuum grips 432 are released. After depositing top chamber plate on the return conveyor 21, the disassembly apparatus 420 returns to the position illustrated in FIG. 28 to begin another cycle.

In a similar matter, after the transfer means 450 has removed the molds and contact lenses from the mold carrier plate 74, the push plate 440 translates the carrier plate 74 between guide rails 460, 461 to the position 21e immediately adjacent to return conveyor 21. A second push plate 462, which is powered by another drive cylinder mechanism 463, is used to drive the push plate 462, along its path of travel. The drive cylinder 463 is mounted for reciprocation in the X axis of FIG. 1 along support beam 465. The drive 463 moves the push plate 462 to from the position illustrated in FIG. 28 to the position 462a immediately adjacent the return conveyor 21.

Thus, each of the hydration carriers 200 is dis-assembled, with the top chamber plate 50 and the bottom mold carrier plate being sequentially returned along the return conveyor 21 for the next cycle of operation. While IKO ball screw drives have been used throughout the hydration apparatus for the movement of various components, it should be understood that other drive mechanisms such as rodless cylinders, pneumatic or hydraulic cylinders or mechanical screw or chain drives could be used to accomplish the same purpose.

LENS PACKAGING

The lens and mold transfer means 450 may then transfer the individual molds and lenses to a pair of 2×8 inspection pallets for automated inspection, as described in U.S. Ser. No. 432,987 entitled "POST HYDRATION METHOD AND APPARATUS FOR TRANSPORTING, INSPECTION, AND PACKAGING CONTACT LENSES", the disclosure of which is incorporated herein by reference thereto. Each mold part 240 is self aligned in a tapered cylindrical bore in the inspection pallet and then preferably dosed with deionized water for optical inspection. Following the optical inspection, the deionized water is removed from the mold package as described in U.S. Ser. No. 08/617,304 entitled "SOLUTION REMOVAL NOZZLE", the disclosure of which is incorporated herein by references thereto. Following the removal of the deionized water, the individual molds and lenses are transferred to the packaging arrangement illustrated in FIG. 30 for saline dosing and packaging. Lenses which have failed the automated inspection are not transferred to the packaging arrangement illustrated in FIG. 30, and may be separately discarded as described in the "POST-HYDRATION METHOD AND APPARATUS" application referred to above or may remain in the inspection pallet to be subsequently removed by a vacuum head and then discarded.

The preferred apparatus for saline dosing and package sealing is more completely described in U.S. Ser. No. 08/431,891 entitled "PACKAGING ARRANGEMENT", the entire disclosure of which is incorporated herein by reference thereto. FIG. 30 illustrates in diagrammatic form this PACKAGING ARRANGEMENT in which, at the initial work station 340, a robotic loading arm 319 transfers a 2×5 array of mold packages 240. Each of the mold packages is secured to the robotic loading arm by a suction cup, which then places the mold packages 240 and the lenses therein in a support pallet 314 then at the first work station.

The lens packaging station receives individual mold packages, each of which has a contact lens therein, which are lined up and queued for packaging on two side by side accumulator columns on a conveyor belt. The package bases are precisely accumulated in the side by side accumulator columns such that the robotic handling arm, having a 2×5 array of vacuum handling cups, one for each individual mold package, can pick up a 2×5 array of individual mold packages 240 and load the mold packages bases onto a pallet 314 on the endless conveyor.

Each support pallet 314 has a unique design relative to prior art support pallets, in that the mold packages are nominally positioned in the support pallet by the receiving cavities 332 with a separation, in the range of 200 to 400 $\mu$meters, between the shoulders of adjacent mold package flanges. The separation also aids in subsequent separation of the resultant adjacent packages by consumers from the remainder of packages in the array. The support pallet 314 spaces the side of each mold package 240 a nominal distance, in the range of 200 to 400 $\mu$meters, from the side of each adjacent package base in the support pallet, to prevent overlapping edges of adjacent product bases. However, the side by side accumulator columns accumulate mold packages in positions in which mold packages directly touch one another. To compensate for the slight difference from the nominal distance between adjacent package bases in the pallet, the robotic arm 319, after positioning an array of mold packages over a pallet 314, initially releases the vacuum in each vacuum cup 338 to allow the mold packages to rest in the support pallet 314. The robotic arm 319 then raises and lowers the array of suction cups 338 slightly to tap each mold package into a properly aligned position in the support pallet 314, as provided for by the rounded mold cavity 252 which is self aligning with respect to the cavity 332.

The linear conveyor is then intermittently indexed through successive work stations, stopping for approximately 5–6 seconds at each work station, such that all of the operations as described herein can be performed simultaneously at the successive work stations. At a second work station 342, an alignment check is made to check that no mold packages are skewed or tilted in the support pallet 314. The alignment check is performed by two through-beam detectors, as are available commercially from Keyence, each of which includes a light sources 344, which directs a beam of light along the length of and just above a 1×5 column of mold packages supported in the pallet 314 to detectors 346 at the other end of the column. If a mold package base 16 is skewed or tilted in the pallet 314, it will interrupt the through beam, and the photodetectors 346 at the other end of the through beam will so indicate.

At third, fourth and fifth positions 348, 350 and 364, a slide unit 352, is displaceable, along slide rails with end stops, above the endless conveyor by a pneumatic drive cylinder to reciprocate back and forth, along the direction of travel of the endless conveyor, between upstream and downstream positions which are spaced apart by the distance between the two rows in each pallet.

The slide unit supports an array of operating mechanisms for performing operating functions on an array of individual mold packages supported in a pallet 314 positioned therebelow. The slide unit reciprocates through upstream and downstream movements a distance equal to the distance between adjacent rows, such that the array of operating mechanisms is successively positioned over each 1×5 row of package bases in each support pallet.

The slide unit supports a plurality of different arrays of operating mechanisms, spaced apart by the distance separating adjacent pallets on the endless conveyor, such that each array of operating mechanisms is positioned above a different pallet 314 on the endless conveyor, and each array of operating mechanisms performs a different operating function on the individual package bases.

The slide unit supports a holder arm 357 for a 1×5 array of optical probes 358 positioned above the third station 348, a 1×5 array of dosing tubes 360 positioned above the fourth station, and a 1×5 array of dosing verification optical probes 386 positioned above the fifth station 364.

At the third station 348, a 1×5 array of fiber optic probes 358, FIGS. 2 and 9, are positioned sequentially above each 1×5 row of the 2×5 array of mold packages to verify the presence of each package in the array of package cavities 332 in the pallet. Each fiber optic probe 358 is positioned centrally over the open flange 242 area (illustrated in FIG. 19a) of each mold package 240, and the fiber optic probe 358 illuminates each mold package, and then detects the radiation reflected therefrom to verify the presence of each mold pack 240. The fiber optic probes 58 can be of a type available commercially from Omron. Each such fiber optic detector probe 358 comprises a dual optical fiber arrangement in which one optical fiber carries light to illuminate the flange 242 of each mold package and a second optical fiber carries light reflected from the mold package flange back to a photodetector.

At the fourth station 350, the slide unit 352 supports a holder arm 359 which holds a 1×5 array of dosing tubes 360, each of which is supplied by a separate dosing pump 362. Each dosing tube 360 deposits a precise dosage of saline solution into the cavity 252 in each mold package, such that each contact lens 8 is completely immersed in saline solution. The rate of pumping of saline solution and the diameter of each dosing tube 360 is chosen such that no saline solution splashes from any of the cavities of any of the mold packages, which is very important as any saline solution splashed onto any sealing flange 242 surfaces would interfere with subsequent sealing and packaging operations.

The diameter of each dosing tubes 60, and the pumping rate therethrough have been determined empirically, with the internal diameter of each dosing tube 360 at the exit orifice being approximately ⅛ inch, and the pumps 362 being positive displacement ⅜ (or possibly ½) inch diameter piston metering pumps, as are available from Oyster Bay Pump Works. The amount of saline solution pumped into each package base may be from 200 to 1000 μliters ±50 μliters, depending on the volume of the packaae base. Saline solution is available in the plumbing of the building in which the packaging station is located to supply the metering pumps.

The optical verification probes 358 are one pallet increment ahead of the dosing tubes 360 to verify that the package bases are present before the dosing tubes fill the package bases with saline solution.

At a subsequent fifth dosage verification station 364, referring to FIG. 1, the slide unit 352 supports a 1×5 array of optical probes 366 positioned above the array of blister pack bases, which verify the presence of a measured dose (given level) of saline solution in each blister pack base. The operation of the slide unit 352 is the same as previously described. Each detector can be a reflective sensor as is commercially available from Omron, or could be an ultrasonic detector, or could be a proximity sensor or could be a fiber optic probe, as commercially available from Keyence as model 24W-V25R, used with an amplifier, model 24W-AA1C. Each detector checks and verifies for a proper height of saline solution in each blister pack base. The verification of a measured dosage of saline solution can be considered to be optional, particularly if the reliability of the dosing equipment is high.

The arrangement is such that after the conveyor is stopped, the slide unit 352 is translated to its upstream position which positions the detectors 358, tubes 360 and detectors 366 over the upstream 1×5 row of package bases to perform their respective functions, after which the slide unit 352 is translated to its downstream position which positions the detectors 358, tubes 360, and detectors 366 over the downstream 1×5 row of package bases to perform their respective functions, after which the conveyor is incrementally indexed to advance the next set of pallets, and the above cycle of operation is then repeated.

At a subsequent foil pick and place station 370, a pair of strips of laminar foil cover sheets is placed over the 2×5 array of package bases. Each laminar top sheet covers a 1×5 column of bases, and has printed thereon all identification indicia required for the final package. The laminar top cover sheets are produced by a foil labeling machine pursuant to the disclosure of patent application entitled "APPARATUS AND METHOD FOR PREPARING AND PRINTING LABELS" (attorney docket 9013), U.S. Ser. No. 08/257, 789. The foil labeling machine extends at a right angle to the linear packaging machine, as indicated by the FOIL arrow in FIG. 1. The pair of laminar top cover sheets from the labeling machine is placed by a foil pick and place unit, having an array of suction cups to lift and place a laminar top sheet 224 over the top of each 1×5 row of the 2×5 array of package bases.

Referring to FIG. 1, at a subsequent mechanical chucking station 74, positioning arms 76 mechanically chuck each laminated foil cover to ensure that it is properly positioned and aligned relative to the mold packages in the support pallet, as is more completely described in U.S. Ser. No. 08/431,891 entitled "PACKAGING ARRANGEMENT", referred to above.

At a subsequent cover presence verification station 380, optical probes 382, 384 in an optical inspection station 327 verify the presence and correct general positioning of each foil cover sheet over the package bases in the support pallet.

The optical inspection station includes an 10 optical inspection plate 386 which carries the plurality of optical probes 382, 384 positioned to examine the outer edges of each foil cover sheet. The optical detector probes are preferably positioned with one probe 382 at each end and one probe 384 along the lengthwise edge of a properly positioned sheet of laminated foil cover on each 1×5 row. Each optical detector probe is preferably a triangulation type of probe wherein an optical beam from an optical fiber is triangulated and reflected by the foil cover to an angularly positioned optical fiber detector, as are available commercially from Omron. The optical inspection station 327 ensures the presence and general positioning of a laminated foil cover sheet on each row of mold packages, to ensure that a heated sealing head in a subsequent heat sealing station does not press down on an uncovered row of package bases which would then melt onto and foul the heated sealing head.

At a subsequent work station designated 396, the top sheet is heat sealed to the mold packages to form an array of packages 220. A heated seal head 398 heated by a plurality of electric heaters are mounted at spaced intervals along the length of the heating head plate 398. The heating head plate 398 is secured to the back of a heat seal die, and is supported by a pneumatic cylinder or press which presses the heated seal head 398 against the laminar top sheets on the mold packages, which are supported by the pallet 314 such that the foil laminate mold package flanges are squeezed between the heated seal head and the pallet. The heated seal head is electrically heated, and the temperature thereof is measured by thermal transducers on each side of the seal head to maintain the correct temperature. The temperature is maintained in a range of 214° C.±1.5° C., which is high when compared to similar prior art arrangements.

The heated seal head comprises a 2×5 array of cylindrical sealing elements, each of which secures the top laminar sheet to each package with an annular seal around the cavity 252 in the mold package.

In operation, the back force generated by the pneumatic cylinder is measured by an in-line load cell, and a solid state timer 316, FIG. 1, is initiated when a force is reached of a given percentage, e.g., 60–75%, of the peak force of which the pneumatic cylinder is capable. The solid state timer times a relatively short time period of approximately 1.0 to 1.4 seconds, after which the pressure in the pneumatic cylinder is released. This approach, when compared with similar prior art approaches, is very hot, very hard and very short, which creates a seal which is both detachable and consumer friendly.

The endless conveyor is reinforced under the heat sealing station to withstand the heat sealing forces imparted thereto by the pneumatic cylinder. The pneumatic cylinder at the heat sealing station 396 applies a substantial force to the support pallet, and accordingly the endless conveyor is reinforced by a die stopper support block on the frame beneath the pneumatic press to withstand the forces imparted thereto by the pneumatic press.

A second optical inspection station 329 is located downstream of the heat sealing station 396, and also includes a plurality of optical detector probes 318 which examine the outer edges of each sheet of laminated foil covers on the array of package bases to ascertain that the sheet is properly and precisely positioned and heat sealed relative to the array of package bases. The optical detector probes are preferably positioned with five probes 318 along the lengthwise edge (along the 150 mm side) of a properly positioned sheet of laminated foil cover on each 1×5 row. Each optical detector probe is preferably a triangulation type of probe wherein an optical beam from an optical fiber is triangulated and reflected by the foil cover to an angularly positioned optical fiber detector, as are available commercially from Omron.

At the last position, referring to FIG. 1, a pneumatically driven robotic arm 321, having three vacuum suction cups 322 for each 1×5 array of blister packs, lifts each 1×5 array of blister packs from the support pallet 314, and deposits the array of blister packs to an output position.

The second optical inspection station 329 ascertains whether or not each sheet of laminated foil covers is properly positioned relative to a row of package bases. Rows of covered packages which pass inspection are transferred by the robotic transfer arm 321 from the endless conveyor to an output for final secondary packaging, while rows of covered packages which fail the inspection are not removed, and the system controller responds to the inspection station and controls the transfer equipment 321 to discriminate between passed and failed rows, even in the same support pallet. In greater detail, the robotic arm 321 applies a vacuum to suction cups 322 and transfers passed rows of covered packages from the endless conveyor to an output for secondary packaging, while a vacuum is not applied to the suction cups 322 for failed packages. A reject chute and bin 324 is positioned below the downstream end of the endless conveyor, and failed rows of covered packages remain on the endless conveyor and are dumped into the reject chute and bin.

After being deposited at the output position, the passed packages may then be subjected to sterilization, as in the instance when the product housed therein is intended to be employed in a medical capacity, for example, a product such as a contact lens which is adapted to be packed in a sterile saline solution and sealed in a compartment or cavity of the package. The mold packages can then be subjected to a secondary packaging operation, such as one in which packages of 1×5 blister packs are placed in a final outer package which as previously illustrated and described with respect to FIG. 18.

It is noted that the dosing verification may be eliminated in some embodiments. Moreover, in alternative embodiments, the endless conveyor could be designed with fewer (or more) support pallets 314, positioned there around, depending upon the number of different functions to be accomplished by the packaging arrangement. Moreover, linear packaging arrangements having linear conveyor lines with linearly spaced stations there along are also contemplated for use in alternative embodiments of the present invention.

While the invention has been particularly shown and described with respect to the preferred embodiments, it will be understood by those skilled in the art. The changes in forms and details may be made therein without departing from the spirit and scope of the invention, which is limited only by the scope of the following claims.

We claim:

1. The combination of a soft contact lens and a package for molding, hydrating and storing the lens which comprises: a female mold having a optical quality mold cavity for defining one surface of the molded lens and a flange configuration around the cavity which permits a male mold to be removed from the female mold without removing the lens; said female mold and flange facilitating robotic handling of the female mold and lens for hydrating and inspecting the lens in deionized water in said optical quality mold cavity; a saline storage liquid; and a removable foil which seals the cavity containing the lens and the saline storage liquid.

2. The combination of a soft contact lens and a package as claimed in claim 1 wherein the removable foil is heat sealed to said flange.

3. The combination of a soft contact lens and a package as claimed in claim 1 where said flange is tear-dropped shaped and includes a gripping portion.

4. The combination of a soft contact lens and a package as claimed in claim 1 wherein said flange is duck-bill shaped terminating in a rounded and downwardly turned end portion.

5. The combination of a soft contact lens and a package as claimed in claim 1, wherein a plurality of molds and contact lenses are heat sealed to a single sheet of removable foil to form an array of molds.

6. The combination of a soft contact lens and a package as claimed in claim 5 wherein said removable foil includes a row of perforations between each mold to allow a single mold to be removed from said array with a severed foil portion sealed thereto.

7. The combination of a soft contact lens and a package as claimed in claim 5 wherein said combination further includes a secondary package which packages a plurality of arrays of molds, each array having a sheet of foil with a plurality of molds secured thereto in a linear array.

8. The combination of a soft contact lens and a package as claimed in claim 7 wherein every other sheet of foil is inverted to allow respective arrays of molds to nest adjacent one another.

* * * * *